United States Patent
Sarkar et al.

(10) Patent No.: US 8,717,887 B2
(45) Date of Patent: May 6, 2014

(54) SCRAMBLING CODE PLANNING DEVICE AND METHOD FOR USING SAME IN WIRELESS COMMUNICATION NETWORK

(75) Inventors: Debasish Sarkar, Gurgaon (IN); Ayan Sen, Gurgaon (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 217 days.

(21) Appl. No.: 13/204,776

(22) Filed: Aug. 8, 2011

(65) Prior Publication Data
US 2013/0039281 A1 Feb. 14, 2013

(51) Int. Cl.
*H04L 12/26* (2006.01)

(52) U.S. Cl.
USPC .......................................... 370/230; 370/229

(58) Field of Classification Search
USPC ................ 370/329; 455/422.1–460, 524–525
See application file for complete search history.

(56) References Cited

U.S. PATENT DOCUMENTS

| | | | |
|---|---|---|---|
| 6,594,468 B1 * | 7/2003 | Ramanathan | 455/7 |
| 6,684,086 B2 * | 1/2004 | Miya | 455/562.1 |
| 6,876,643 B1 * | 4/2005 | Aggarwal et al. | 370/338 |
| 7,035,240 B1 * | 4/2006 | Balakrishnan et al. | 370/338 |
| 7,039,409 B2 * | 5/2006 | Lobinger et al. | 455/443 |
| 7,061,890 B2 * | 6/2006 | Kim et al. | 370/335 |
| 7,203,729 B2 * | 4/2007 | Chen et al. | 709/209 |
| 7,280,467 B2 * | 10/2007 | Smee et al. | 370/208 |
| 7,436,963 B2 * | 10/2008 | Lo Iacono et al. | 380/268 |
| 7,733,818 B2 * | 6/2010 | Twitchell, Jr. | 370/311 |
| 7,751,360 B2 * | 7/2010 | Yagyu et al. | 370/328 |
| 7,768,989 B2 * | 8/2010 | Nerses et al. | 370/345 |
| 7,840,353 B2 * | 11/2010 | Ouksel et al. | 701/300 |
| 7,996,510 B2 * | 8/2011 | Vicente | 709/223 |
| 8,014,362 B2 * | 9/2011 | Panico et al. | 370/335 |
| 8,055,740 B2 * | 11/2011 | Kim et al. | 709/221 |
| 8,064,424 B2 * | 11/2011 | Sambhwani et al. | 370/342 |
| 8,064,942 B2 * | 11/2011 | Yang et al. | 455/518 |
| 8,072,914 B2 * | 12/2011 | Brisebois et al. | 370/311 |
| 8,081,605 B2 * | 12/2011 | Francalanci et al. | 370/335 |
| 8,095,131 B2 * | 1/2012 | Yacono | 455/434 |
| 8,139,542 B2 * | 3/2012 | Dong et al. | 370/332 |
| 8,144,596 B2 * | 3/2012 | Veillette | 370/238 |
| 8,199,689 B2 * | 6/2012 | Maltseff et al. | 370/312 |
| 8,270,600 B2 * | 9/2012 | Kishiyama et al. | 380/34 |
| 8,295,295 B2 * | 10/2012 | Winter et al. | 370/411 |
| 8,300,551 B2 * | 10/2012 | Koop et al. | 370/254 |
| 8,358,604 B2 * | 1/2013 | Hu et al. | 370/310 |
| 8,442,096 B2 * | 5/2013 | Sambhwani et al. | 375/150 |
| 2009/0161589 A1 * | 6/2009 | Twitchell, Jr. | 370/311 |
| 2010/0285793 A1 * | 11/2010 | Yoon et al. | 455/422.1 |
| 2011/0039560 A1 * | 2/2011 | Hratko et al. | 455/436 |
| 2011/0086652 A1 * | 4/2011 | So et al. | 455/501 |
| 2012/0250565 A1 * | 10/2012 | Zhang et al. | 370/252 |
| 2013/0165143 A1 * | 6/2013 | Ziskind et al. | 455/456.1 |

OTHER PUBLICATIONS

Korean unexamined patent applications: 10-2008-0083690.*

(Continued)

*Primary Examiner* — Mark Rinehart
*Assistant Examiner* — Peter Solinsky

(57) ABSTRACT

A scrambling code planning device and method are described herein for allocating primary scrambling codes to sites (e.g., Node B's sites) within a wireless communication network. In addition, a wireless communication network is described herein that includes the scrambling code planning device which allocates the primary scrambling codes to the sites (e.g., Node B's sites).

24 Claims, 14 Drawing Sheets

(56) References Cited

OTHER PUBLICATIONS

Jung, Young-Ho and Lee, Yong H., Scrambling Code Planning for 3GPP W-CDMA Systems, Vehicular Technology Conference, 2001, VTC 2001, Spring, IEEE VTS 53rd (vol. 4).*

Demir, Alpaslan and Grieco, Donald, A Robust Algorithm for Step 2 in 3G FDD W-CDMA Synchronization, Vehicular Technology Conference, 2001. VTC 2001 Fall. IEEE VTS 54th (vol. 4).*

Lee, Poongup, Jeong, Jangkeun, Saxena, Navrati, and Shin, Jitae, Dynamic Reservation Scheme of Physical Cell Identity for 3GPP LTE Femtocell Systems, Journal of Information Processing Systems, vol. 5, No. 4, Dec. 2009, pp. 207-220.*

Ye, Wen, Cheng, Lei, Cui, Hongxu, and Bu, Ju, Jeuristic Frequency Optimizing in GSM/GPRS Networks, Lecture Notes in Computer Science vol. 4402, 2007, pp. 101-109.*

Carrano, Ricardo, Bletsas, Michail, Magalhaes, Luiz, Mesh Networks for Digital Inclusion—Testing OLPC's XO Mesh Implementation, 2007.*

\* cited by examiner

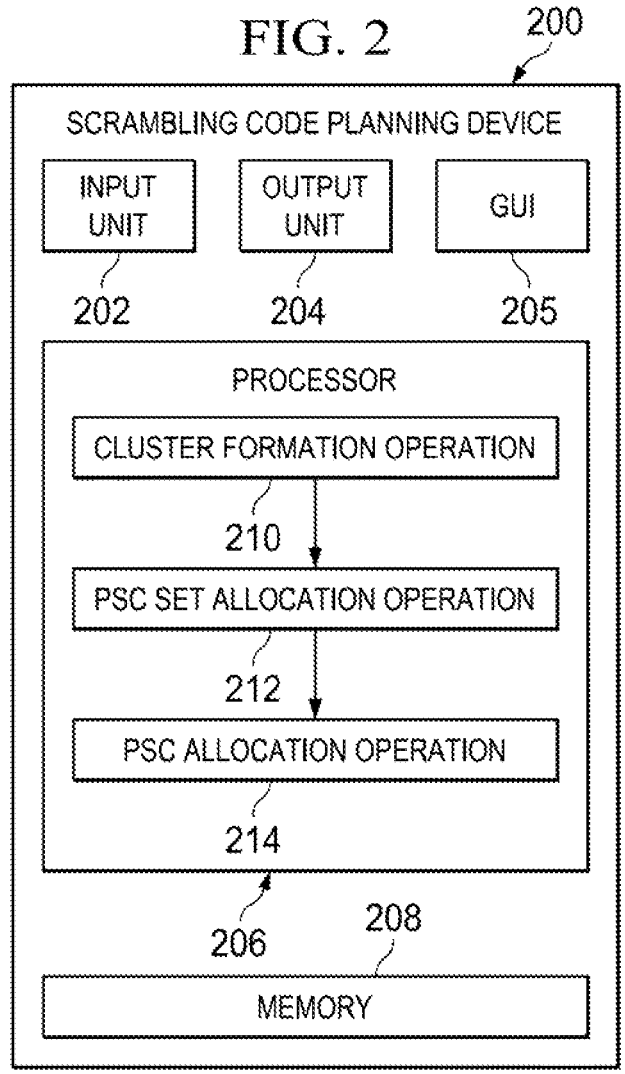

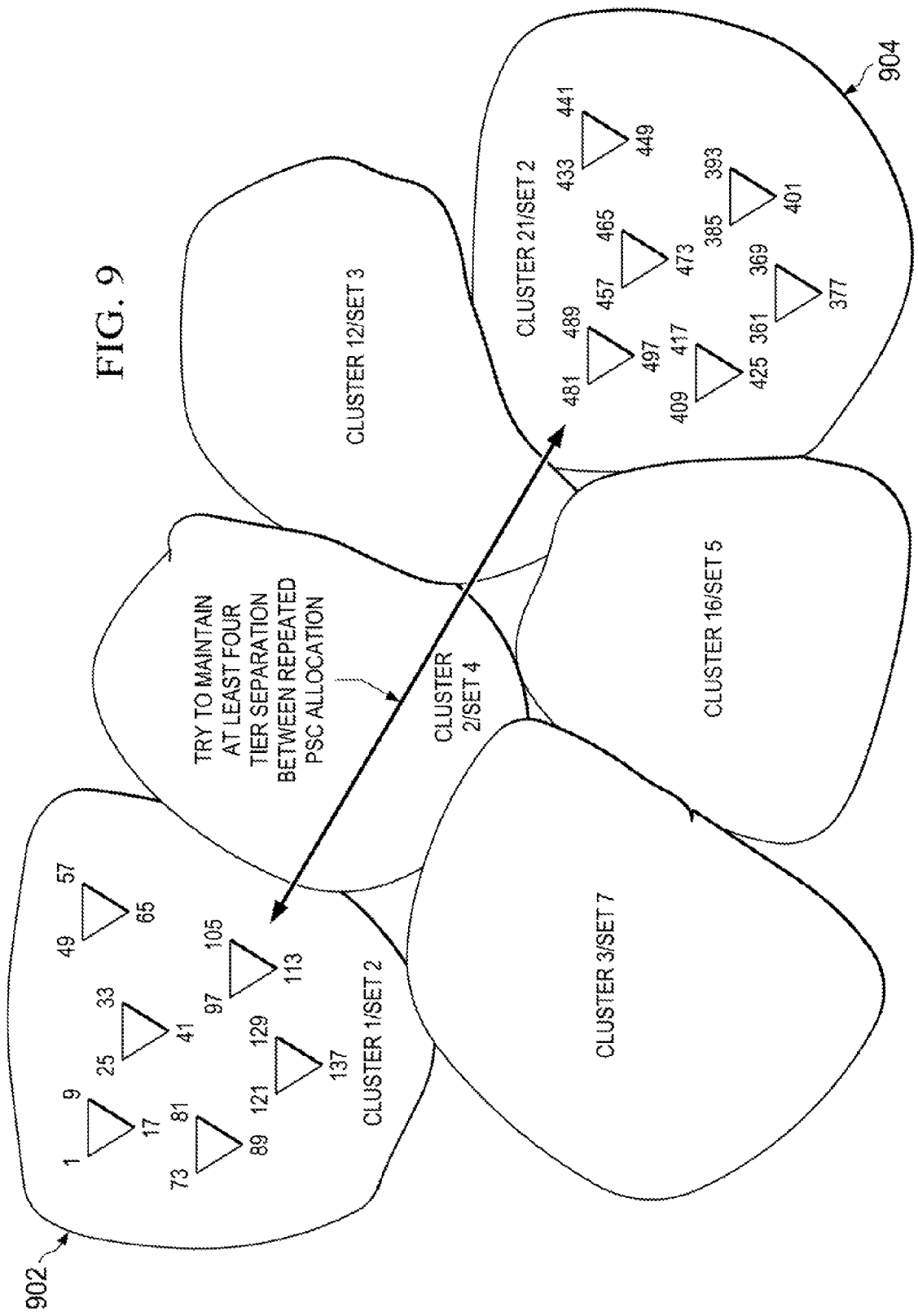

SCRAMBLING CODE PLANNING DEVICE AND METHOD FOR USING SAME IN WIRELESS COMMUNICATION NETWORK

TECHNICAL FIELD

The present invention relates to a scrambling code planning device and method for allocating primary scrambling codes to sites (e.g., Node B's sites) within a wireless communication network. In addition, the present invention relates to a wireless communication network that includes sites (e.g., Node B's sites) and the scrambling code planning device which allocates the primary scrambling codes to the sites (e.g., Node B's sites).

BACKGROUND

The following definitions and abbreviations are herewith defined, at least some of which are referred to within the following description about at least the prior art and/or the present invention.

| | |
|---|---|
| 3GPP | Third Generation Partnership Project |
| HSDPA | High-Speed Downlink Packet Access |
| HSUPA | High-Speed Uplink Packet Access |
| GUI | Graphical User Interface |
| IBS | In Building Site |
| OSS | Operational Support System |
| PSC | Primary Scrambling Code |
| RNC | Radio Network Controller |
| UE | User Equipment |
| UMTS | Universal Mobile Telecommunications System |

Inter site distance: refers to the distance between sites. For a typical deployment scenario in a dense urban area, this distance might be as low as 300 m.

Tier 1 neighbor conflict: refers to the cases where source site and neighboring site have the same PSC allocated.

Tier 2 neighbor conflict: refers to the case where two different neighboring sites of the same source site have the same PSC allocated.

In UMTS wireless telecommunication networks, each UE is assigned a unique code which it then uses to encode its information bearing signal. The Node B knows the code used by the UE so it is able to decode a signal received from the UE and recover the original data. Furthermore, each Node B is assigned a different scrambling code and each data channel is assigned a different channelization code. For the UE to successfully decode a signal from the Node B it must be able to uniquely identify the site (cell) managed by the Node B. Since the total number of scrambling codes for downlink communications is limited to 512, it becomes necessary to assign scrambling codes to the sites in such a way that the UE at a given point does not receive signals from two sites bearing the same scrambling code. A discussion is provided next about some different techniques which are known for allocating the primary scrambling codes to the Node B's sites within a wireless communication network.

In UMTS a total of 512 scrambling codes are available in downlink and they can be divided into 64 code groups. Each code group has eight scrambling codes. These code groups can be characterized as follows:

TABLE 1

| Macro cells | Codes $8x + 0$, $8x + 1$, $8x + 2$, $8x + 3$, $8x + 4$, $8x + 5$, $8x + 6$, where $x = 0$ to 63 |
|---|---|
| Tall Boomer sites + IBS + New Sites | Codes $8x + 7$ where $x = 0$ to 63 |

The tall boomer sites are those which can give significant coverage but also pose bigger risks of being the source of interference to other sites. IBS includes in-building cells.

The above code partitions can be depicted as follows:

TABLE 2

| | 64 Code Groups | | | | | |
|---|---|---|---|---|---|---|
| Colors Groups | 1 | 9 | 17 | ... | 505 | Macro Sites |
| | 2 | 10 | 18 | ... | 506 | |
| | 3 | 11 | 19 | ... | 507 | |
| | 4 | 12 | 20 | ... | 508 | |
| | 5 | 13 | 21 | ... | 509 | |
| | 6 | 14 | 22 | ... | 510 | |
| | 7 | 15 | 23 | ... | 511 | |
| | 8 | 16 | 24 | ... | 512 | Boomer + IBS |

FIG. 1A (PRIOR ART) depicts an exemplary guideline for codes with respect to the orientation of the antenna in the Node B's site. In this illustration, there is depecited a Node B's macro site 102 and a Node B's IBS site 104.

In UMTS wireless communication networks, the neighboring sites can be allocated scrambling codes utilizing various strategies. The choice of the allocation scheme has impact on processing requirements and synchronization performance at the UE. For instance, consider the case of a simple network comprising of only six adjacent sites. One way of code planning such a network would be to use different scrambling codes belonging to the same code group or alternatively, different codes could be assigned which are taken from exactly six different code groups. The former technique eventually oversimplifies a second stage of synchronization (frame synchronization and code group determination) and imposes all the required processing on a third stage of synchronization (scrambling code determination). In contrast, the latter technique puts all the processing on the second stage of synchronization (frame synchronization and code group determination) and totally eliminates the third stage of synchronization (scrambling code determination). The first stage of synchronization is slot synchronization. Consequently, the best code planning strategy is a trade-off between the processing load on the UE and the synchronization time or effectively the performance of synchronization procedure.

At least one known scrambling code planning technique in order to simplify the initial planning follows these two conditions:

Treat all sites as 3-sector site.

Every 21 sites will have codes from the same scrambling code set (color group).

Therefore, the 21 sites from one "color group" will be assigned primary scrambling codes from one of the primary scrambling code sets 1,2, 3, . . .8 where the primary scrambling code set 1 is reserved for IBS, high boomer and new sites. TABLE 1 shows the color groups starting with scrambling code 0, 1, 2, . . . 7 however for naming them the terms primary scrambling code sets are used hereinafter where the primary scrambling code set 1 (starts with code 0), the primary scrambling code set 2 (starts with code 1), . . . the primary scrambling code set 8 (starts with code 7). TABLES 3A and 3B illustrate this particular scheme for multiple 21 sites:

TABLE 3A

| SET1 | Sec-1 | Sec-2 | Sec-3 | SET2 | Sec-1 | Sec-2 | Sec-3 | SET3 | Sec-1 | Sec-2 | Sec-3 | SET4 | Sec-1 | Sec-2 | Sec-3 |
|---|---|---|---|---|---|---|---|---|---|---|---|---|---|---|---|
| 1 | 0 | 8 | 16 | 1 | 1 | 9 | 17 | 1 | 2 | 10 | 18 | 1 | 3 | 11 | 19 |
| 2 | 24 | 32 | 40 | 2 | 25 | 33 | 41 | 2 | 26 | 34 | 42 | 2 | 27 | 35 | 43 |
| 3 | 48 | 56 | 64 | 3 | 49 | 57 | 65 | 3 | 50 | 58 | 66 | 3 | 51 | 59 | 67 |
| 4 | 72 | 80 | 88 | 4 | 73 | 81 | 89 | 4 | 74 | 82 | 90 | 4 | 75 | 83 | 91 |
| 5 | 96 | 104 | 112 | 5 | 97 | 105 | 113 | 5 | 98 | 106 | 114 | 5 | 99 | 107 | 115 |
| 6 | 120 | 128 | 136 | 6 | 121 | 129 | 137 | 6 | 122 | 130 | 138 | 6 | 123 | 131 | 139 |
| 7 | 144 | 152 | 160 | 7 | 145 | 153 | 161 | 7 | 146 | 154 | 162 | 7 | 147 | 155 | 163 |
| 8 | 168 | 176 | 184 | 8 | 169 | 177 | 185 | 8 | 170 | 178 | 186 | 8 | 171 | 179 | 187 |
| 9 | 192 | 200 | 208 | 9 | 193 | 201 | 209 | 9 | 194 | 202 | 210 | 9 | 195 | 203 | 211 |
| 10 | 216 | 224 | 232 | 10 | 217 | 225 | 233 | 10 | 218 | 226 | 234 | 10 | 219 | 227 | 235 |
| 11 | 240 | 248 | 256 | 11 | 241 | 249 | 257 | 11 | 242 | 250 | 258 | 11 | 243 | 251 | 259 |
| 12 | 264 | 272 | 280 | 12 | 265 | 273 | 281 | 12 | 266 | 274 | 282 | 12 | 267 | 275 | 283 |
| 13 | 288 | 296 | 304 | 13 | 289 | 297 | 305 | 13 | 290 | 298 | 306 | 13 | 291 | 299 | 307 |
| 14 | 312 | 320 | 328 | 14 | 313 | 321 | 329 | 14 | 314 | 322 | 330 | 14 | 315 | 323 | 331 |
| 15 | 336 | 344 | 352 | 15 | 337 | 345 | 353 | 15 | 338 | 346 | 354 | 15 | 339 | 347 | 355 |
| 16 | 360 | 368 | 376 | 16 | 361 | 369 | 377 | 16 | 362 | 370 | 378 | 16 | 363 | 371 | 379 |
| 17 | 384 | 392 | 400 | 17 | 385 | 393 | 401 | 17 | 386 | 394 | 402 | 17 | 387 | 395 | 403 |
| 18 | 408 | 416 | 424 | 18 | 409 | 417 | 425 | 18 | 410 | 418 | 426 | 18 | 411 | 419 | 427 |
| 19 | 432 | 440 | 448 | 19 | 433 | 441 | 449 | 19 | 434 | 442 | 450 | 19 | 435 | 443 | 451 |
| 20 | 456 | 464 | 472 | 20 | 457 | 465 | 473 | 20 | 458 | 466 | 474 | 20 | 459 | 467 | 475 |
| 21 | 480 | 488 | 496 | 21 | 481 | 489 | 497 | 21 | 482 | 490 | 498 | 21 | 483 | 491 | 499 |

TABLE 3B

| SET5 | Sec-1 | Sec-2 | Sec-3 | SET6 | Sec-1 | Sec-2 | Sec-3 | SET7 | Sec-1 | Sec-2 | Sec-3 | SET7 | Sec-1 | Sec-2 | Sec-3 |
|---|---|---|---|---|---|---|---|---|---|---|---|---|---|---|---|
| 1 | 4 | 12 | 20 | 1 | 5 | 13 | 21 | 1 | 6 | 14 | 22 | 1 | 7 | 15 | 23 |
| 2 | 28 | 36 | 44 | 2 | 29 | 37 | 45 | 2 | 30 | 38 | 46 | 2 | 31 | 39 | 47 |
| 3 | 52 | 60 | 68 | 3 | 53 | 61 | 69 | 3 | 54 | 62 | 70 | 3 | 55 | 63 | 71 |
| 4 | 76 | 84 | 92 | 4 | 77 | 85 | 93 | 4 | 78 | 86 | 94 | 4 | 79 | 87 | 95 |
| 5 | 100 | 108 | 116 | 5 | 101 | 109 | 117 | 5 | 102 | 110 | 118 | 5 | 103 | 111 | 119 |
| 6 | 124 | 132 | 140 | 6 | 125 | 133 | 141 | 6 | 126 | 134 | 142 | 6 | 127 | 135 | 143 |
| 7 | 148 | 156 | 164 | 7 | 149 | 157 | 165 | 7 | 150 | 158 | 166 | 7 | 151 | 159 | 167 |
| 8 | 172 | 180 | 188 | 8 | 173 | 181 | 189 | 8 | 174 | 182 | 190 | 8 | 175 | 183 | 191 |
| 9 | 196 | 204 | 212 | 9 | 197 | 205 | 213 | 9 | 198 | 206 | 214 | 9 | 199 | 207 | 215 |
| 10 | 220 | 228 | 236 | 10 | 221 | 229 | 237 | 10 | 222 | 230 | 238 | 10 | 223 | 231 | 239 |
| 11 | 244 | 252 | 260 | 11 | 245 | 253 | 261 | 11 | 246 | 254 | 262 | 11 | 247 | 255 | 263 |
| 12 | 268 | 276 | 284 | 12 | 269 | 277 | 285 | 12 | 270 | 278 | 286 | 12 | 271 | 279 | 287 |
| 13 | 292 | 300 | 308 | 13 | 293 | 301 | 309 | 13 | 294 | 302 | 310 | 13 | 295 | 303 | 311 |
| 14 | 316 | 324 | 332 | 14 | 317 | 325 | 333 | 14 | 318 | 326 | 334 | 14 | 319 | 327 | 335 |
| 15 | 340 | 348 | 356 | 15 | 341 | 349 | 357 | 15 | 342 | 350 | 358 | 15 | 343 | 351 | 359 |
| 16 | 364 | 372 | 380 | 16 | 365 | 373 | 381 | 16 | 366 | 374 | 382 | 16 | 367 | 375 | 383 |
| 17 | 388 | 396 | 404 | 17 | 389 | 397 | 405 | 17 | 390 | 398 | 406 | 17 | 391 | 399 | 407 |
| 18 | 412 | 420 | 428 | 18 | 413 | 421 | 429 | 18 | 414 | 422 | 430 | 18 | 415 | 423 | 431 |
| 19 | 436 | 444 | 452 | 19 | 437 | 445 | 453 | 19 | 438 | 446 | 454 | 19 | 439 | 447 | 455 |
| 20 | 460 | 468 | 476 | 20 | 461 | 469 | 477 | 20 | 462 | 470 | 478 | 20 | 463 | 471 | 479 |
| 21 | 484 | 492 | 500 | 21 | 485 | 493 | 501 | 21 | 486 | 494 | 502 | 21 | 487 | 495 | 503 |

Note:
Codes 504 to 511 can be used in IBSs or any $4^{th}$ sectors, and they can be used as an extra scrambling code in each primary scrambling code set 1, 2 . . . 7.

In view of TABLES 3A-3B, the first site will have codes (1, 9, 17), the second site will have codes (25, 33, 41), etc. Plus, sites in the neighboring "color group" will have SET 1 or SET2 or SET3 of scrambling codes as compared to the first group. As such, sites of the neighboring "color group" will start from (1, 9, 17) etc. For the IBS, new sites and tall boomer sites, the first site may start from (0, 8, and 15). However, it should be noted that in these tables there are no macro-sites and micro-sites in the neighbors that have the same code group. FIG. 1B (PRIOR ART) is provided to graphically illustrate the aforementioned concepts.

Most of the existing scrambling code planning techniques utilize some sort of coverage prediction to allocate the primary scrambling codes to the sites in the wireless communication is network. However, the existing scrambling code planning techniques do not consider the site density (or inter-site distance) or neighbor tier information while planning the scrambling codes which may result in a tier 1 and tier 2 neighbor conflict in dense urban areas where site density is very high. In fact, some of the existing scrambling code planning techniques fail to even consider scrambling code grouping in one cluster to maintain higher order orthogonality. Accordingly, there is and has been a need to address these shortcomings and other shortcomings of the existing code planning techniques. This need and other needs are addressed by the present invention.

SUMMARY

A scrambling code planning device, a method, and a wireless communication network which address the aforementioned shortcomings are described in the independent claims of the present application. Advantageous embodiments of the scrambling code planning device, a method, and a wireless communication network have been described in the dependent claims of the present application.

In one aspect, the present invention provides a scrambling code planning device for allocating a plurality of primary scrambling codes to sites within a wireless communication network. The scrambling code planning device comprises a processor and a memory that stores processor-executable instructions therein where the processor interfaces with the memory and executes the processor-executable instructions to enable the following: (a) forming a plurality of clusters, wherein each cluster includes one or more of the sites of the wireless communications network, and wherein each cluster will not include more than a first predetermined number of sites; (b) allocating one of a plurality of primary scrambling code sets to each of the formed clusters, wherein there are a predetermined number of primary scrambling code sets and each primary scrambling code set includes a predetermined number of the primary scrambling codes; and (c) allocating to the sites in each of the formed clusters which have the same primary scrambling code set allocated thereto the predetermined number of the primary scrambling codes associated with the same primary scrambling code set. An advantage of the scrambling code planning device is that it can allocate the PSCs belonging to different code groups so that the maximum distance and at least two tier separation between the sites which have the same PSC is achieved.

In yet another aspect, the present invention provides a method for allocating a plurality of primary scrambling codes to sites within a wireless communication network. The method implemented by a scrambling code planning device comprises the steps of: (a) forming a plurality of clusters, wherein each cluster includes one or more of the sites of the wireless communications network, and wherein each cluster will not include more than a first predetermined number of sites; (b) allocating one of a plurality of primary scrambling code sets to each of the formed clusters, wherein there are a predetermined number of primary scrambling code sets and each primary scrambling code set includes a predetermined number of the primary scrambling codes; and (c) allocating to the sites in each of the formed clusters which have the same primary scrambling code set allocated thereto the predetermined number of the primary scrambling codes associated with the same primary scrambling code set. An advantage of the method is that it can allocate the PSCs belonging to different code groups so that the maximum distance and at least two tier separation between the sites which have the same PSC is achieved.

In still yet another aspect, the present invention provides a wireless communication system comprising an operational support system (OSS), a plurality of nodes (e.g., Node Bs) each of which manages a site, a controller (e.g., RNC) coupled to the OSS and configured to manage the plurality of nodes, and a scrambling code planning device coupled to the OSS and configured to allocate a plurality of primary scrambling codes to the sites. The scrambling code planning includes a primary scrambling code generation unit which: (a) forms a plurality of clusters, wherein each cluster includes one or more of the sites, and wherein each cluster will not include more than a first predetermined number of sites; (b) allocates one of a plurality of primary scrambling code sets to each of the formed clusters, wherein there are a predetermined number of primary scrambling code sets and each primary scrambling code set includes a predetermined number of the primary scrambling codes; and (c) allocates to the sites in each of the formed clusters which have the same primary scrambling code set allocated thereto the predetermined number of the primary scrambling codes associated with the same primary scrambling code set. An advantage of the scrambling code planning device is that it can allocate the PSCs belonging to different code groups so that the maximum distance and at least two tier separation between the sites which have the same PSC is achieved.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIG. 2 is a block diagram of an exemplary scrambling code planning device configured in accordance with an embodiment of the present invention;

FIG. 9 is a diagram used to help explain how the exemplary scrambling code planning device can perform the PSC allocation operation in accordance with an embodiment of the present invention;

DETAILED DESCRIPTION

Figure 1A:
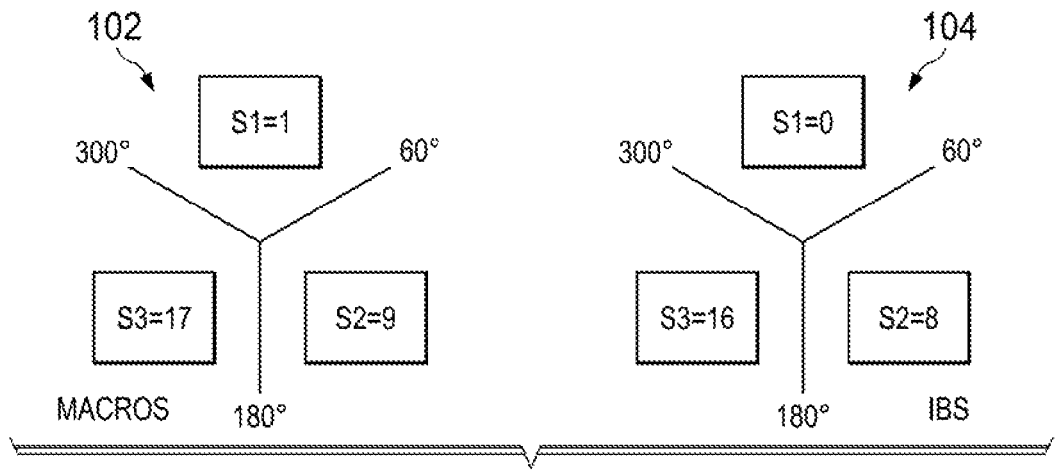
FIGS. 1A-1B (PRIOR ART) are several drawings which are used to help explain the state-of-the-art and various problems associated with traditional scrambling code planning devices.
Figure 1B:
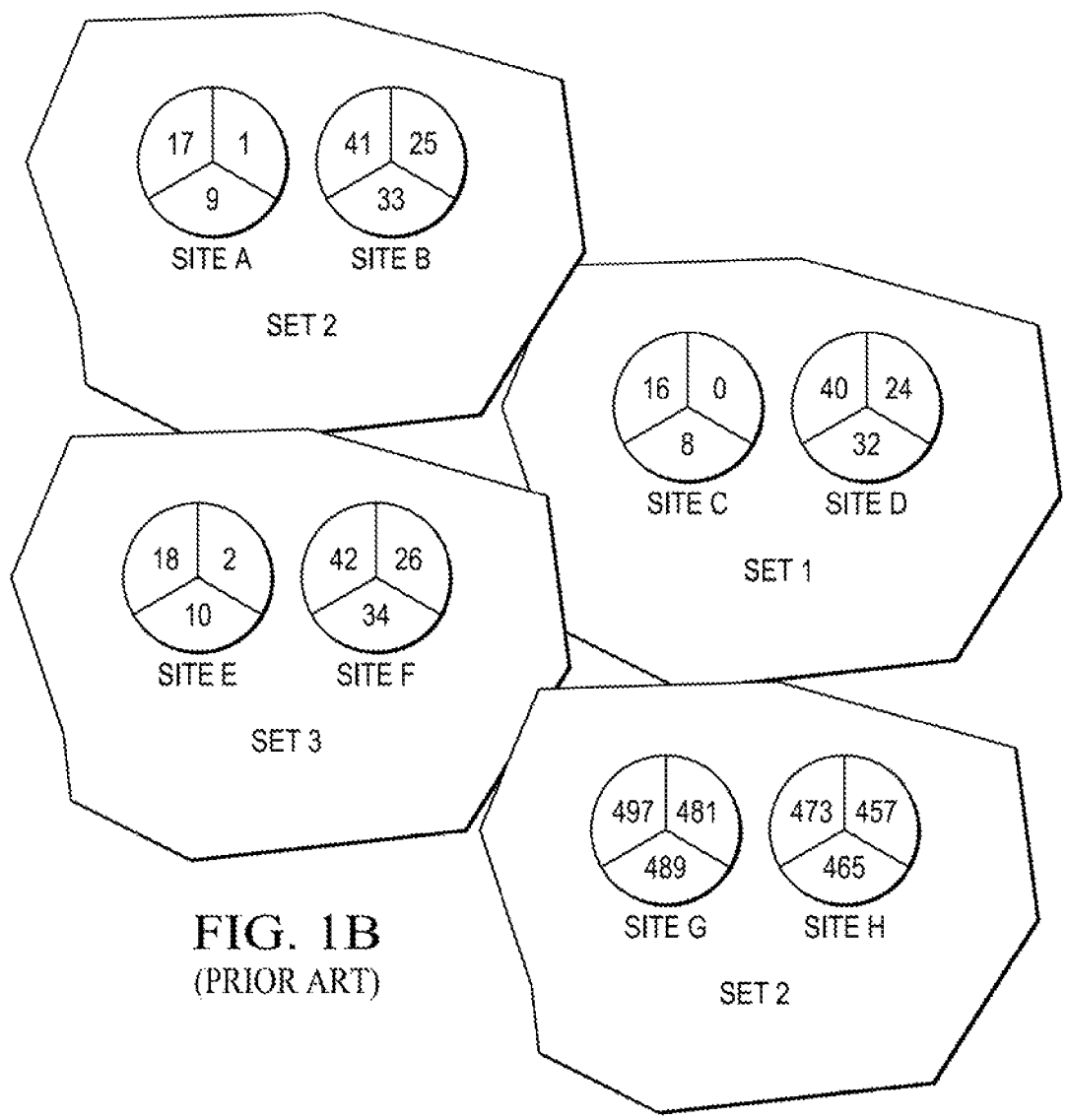

Referring to FIG. 2, there is a block diagram of an exemplary scrambling code planning device 200 configured in accordance with an embodiment of the present invention. The exemplary scrambling code planning device 200 is configured to allocate primary scrambling codes to sites (e.g., Node B's sites) within a wireless communication network based on the to following principles:

Maintain the maximum PSC reuse distance.

Ensure that sufficient number of tier sites are there between a co-PSC.

Evenly distribute PSC usage to the best possible extent.

All PSCs are from each 64 code groups in same cluster.

These principles can be achieved by the exemplary scrambling code planning device 200. As show, the exemplary scrambling code planning device 200 includes an input unit 202, an output unit 204, a graphical user interface 205, a processor 206, and a memory 208. The processor 206 is configured to interface with the memory 208 and execute processor-executable instructions stored therein to allocate primary scrambling codes to sites (e.g., Node B sites) within a wireless communication network by: (a) forming a plurality of clusters, wherein each cluster includes one or more of the sites of the wireless communications network, and wherein each cluster will not include more than a first predetermined number of sites (cluster formation operation 210); (b) allocating one of a plurality of primary scrambling code sets to each of the formed clusters, wherein there are a predetermined number of primary scrambling code sets and each primary scrambling code set includes a predetermined number of the primary scrambling codes (set allocation operation 212); and (c) allocating to the sites in each of the formed clusters which have the same primary scrambling code set allocated thereto the predetermined number of the primary scrambling codes associated with the same primary scrambling code set (PSC allocation operation 214). A detailed discussion is provided next to explain in more detail an exemplary way to perform each of the three aforementioned steps namely the cluster formation operation 210, the set allocation operation 212, and the PSC allocation operation 214.

Cluster Formation Operation 210

Figure 3:
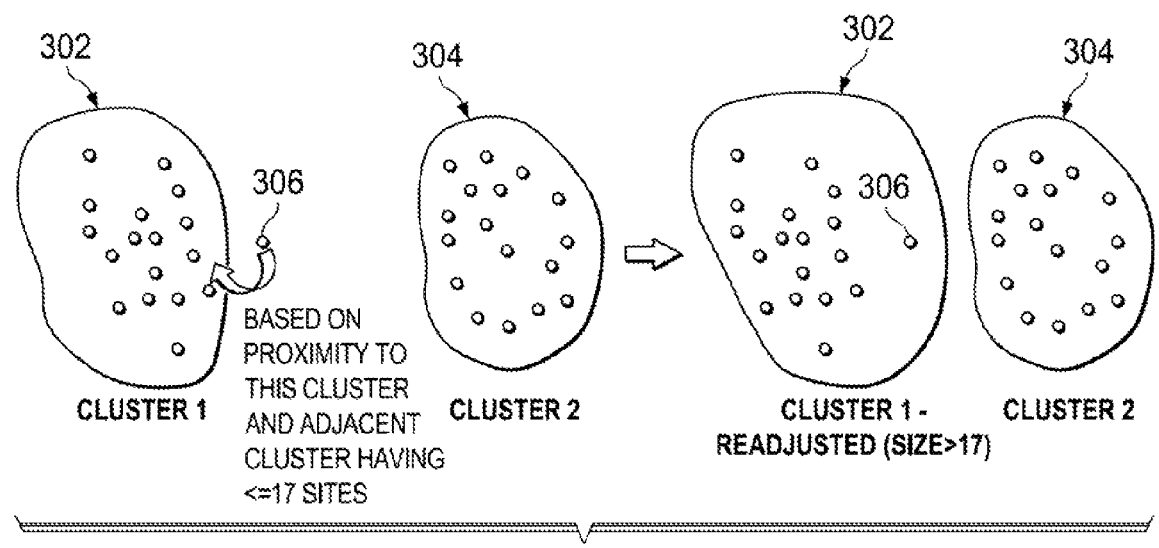
FIGS. 3 and 4 are block diagrams used to help explain how the exemplary scrambling code planning device can perform a cluster formation operation in accordance with an embodiment of the present invention.

The total number of sites is divided into clusters of sites where the cluster size is not to exceed 21 sites. The cluster formation is done dynamically starting from the area having a very high site concentration. Clusters are initially formed with size of 17 sites to keep room for future growth. This will allow the allocation of the unused codes within the same code group without having the need to split the existing cluster. The cluster size can be less than or greater than) 7 sites in the following cases:

Case i (>17 sites/cluster): After all the clusters have been formed with 17 sites, there will be still some sites left in between the clusters because of the asymmetric/random site distribution n. Depending on the proximity of these sites to the surrounding clusters, they are absorbed into the nearest cluster, provided the size of that cluster is less than 21. FIG. 3 illustrates two exemplary clusters 302 and 304 (cluster 1 and 2) where one cluster 302 (cluster 1) absorbs one previously un-placed site 306 to transition from 17 sites to 18 sites.

Figure 4:
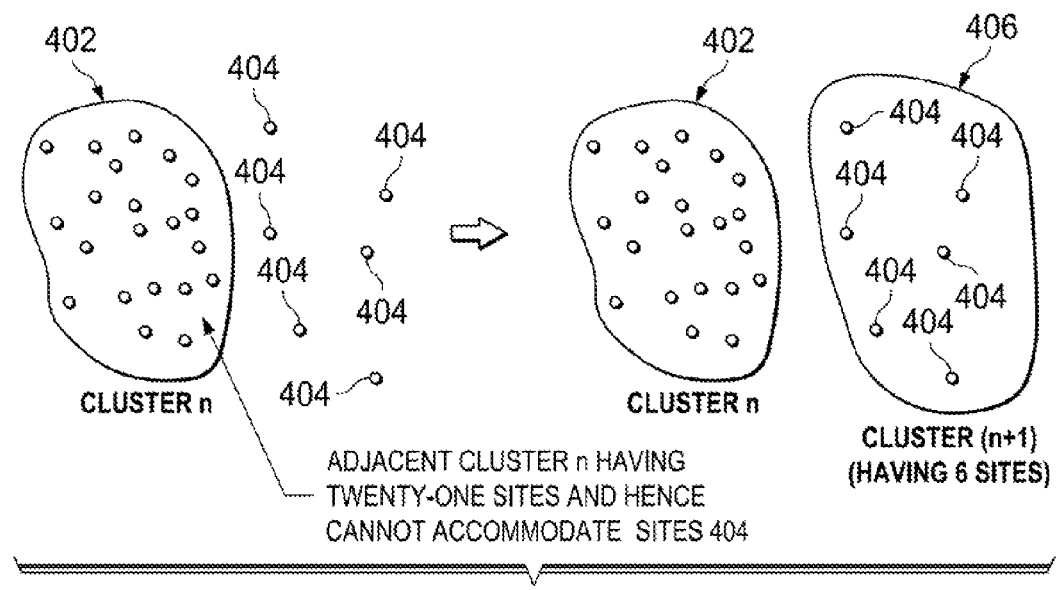

Case ii (<17 sites/cluster): If for the leftover sites, absorption into the surrounding clusters is not possible (surrounding clusters have already reached the maximum permissible size), then a separate cluster is formed with this/these site/s. In such cases, the cluster size will generally be less than 17 sites but they still cannot exceed 21 sites. FIG. 4 illustrates an exemplary cluster 402 which has 21 sites and six previously un-placed sites 404 which are placed in a newly formed cluster 406.

So eventually at the end of the cluster formation operation 210, the wireless telecommunication network's entire market area is divided into clusters whose sizes vary from 1 to 21 sites.

Figure 5A:
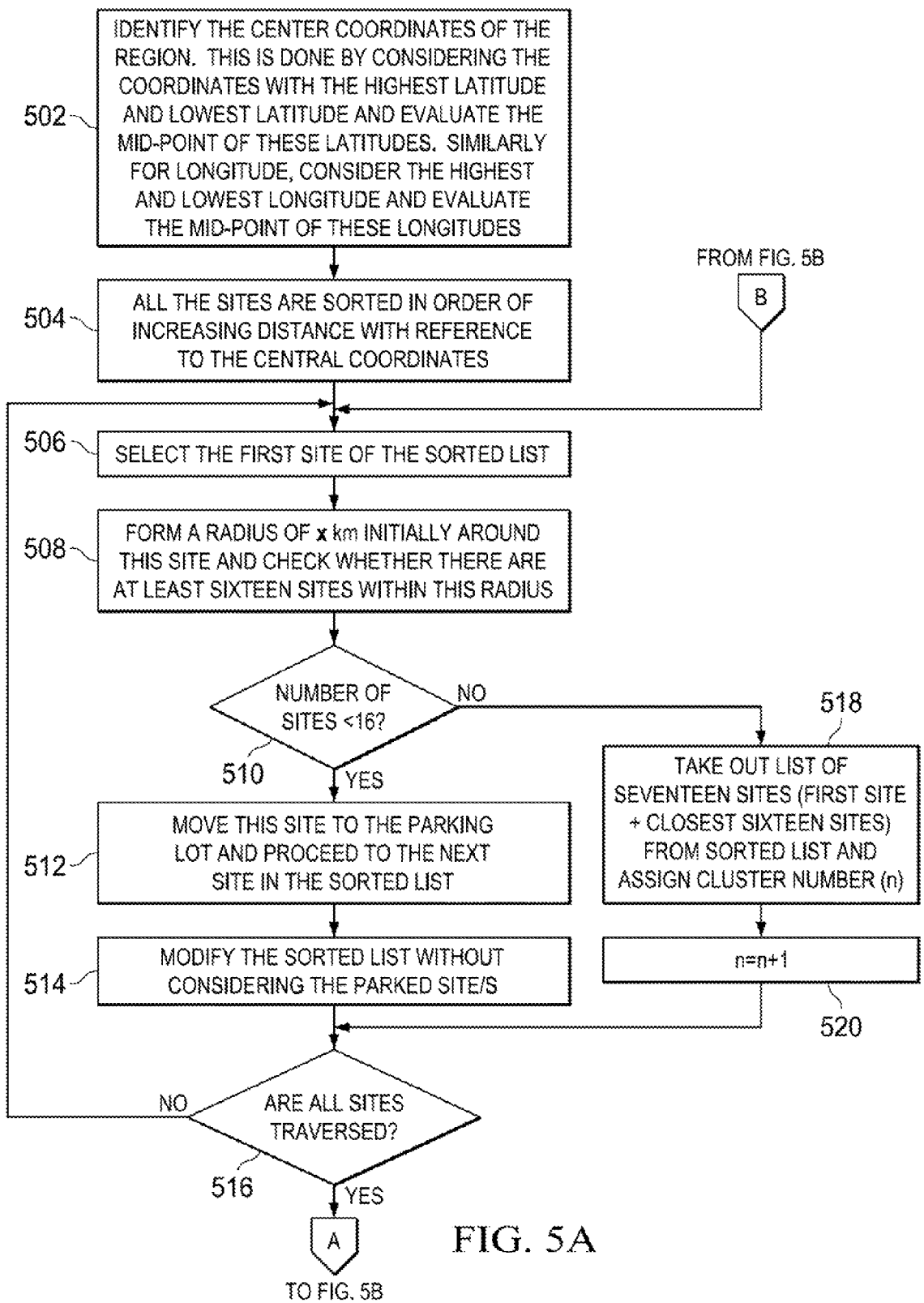
FIGS. 5A-5C is a flowchart illustrating the basic steps of an exemplary cluster formation operation that can be implemented by the exemplary scrambling code planning device in accordance with an embodiment of the present invention.
Figure 5B:
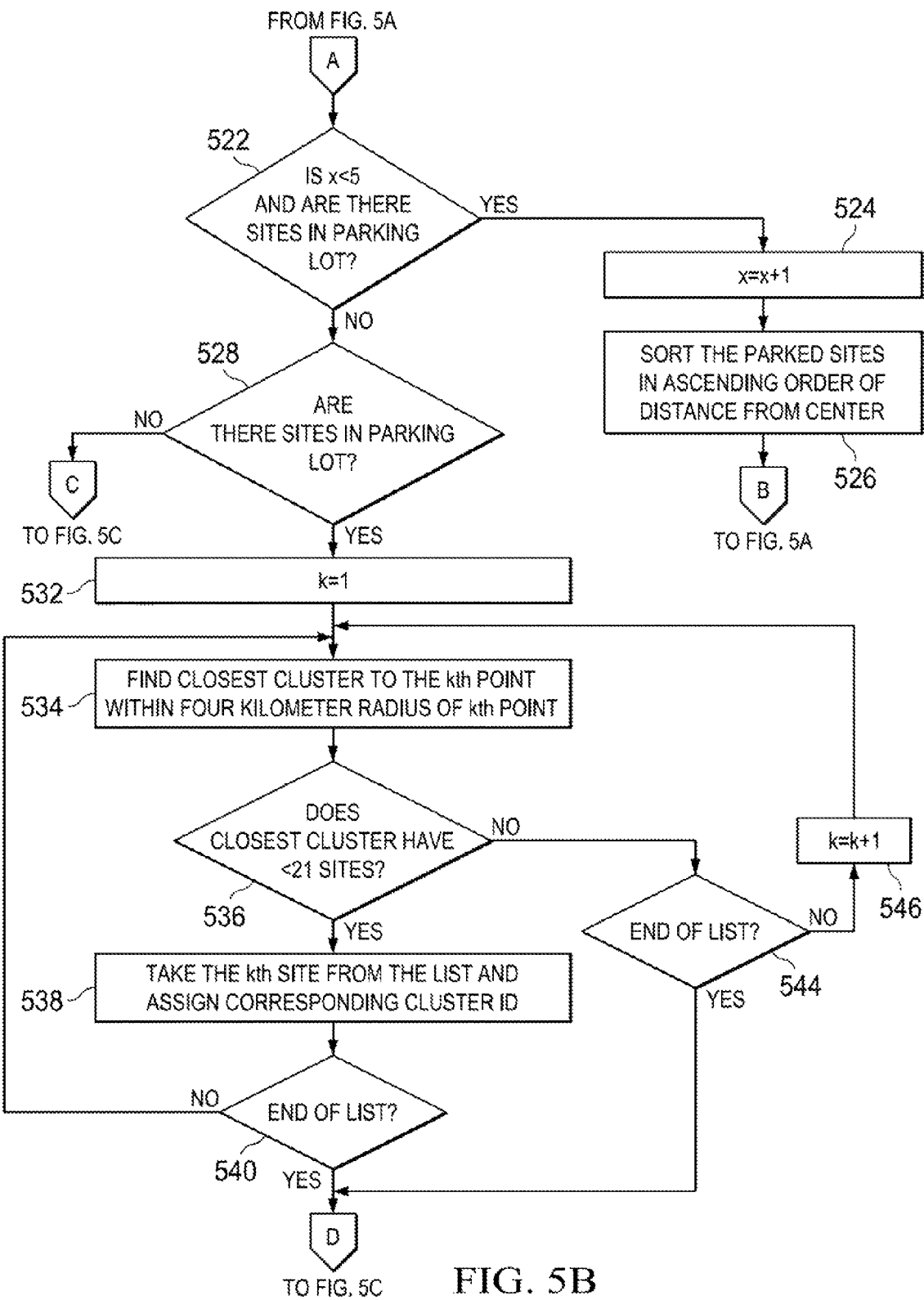
Figure 5C:
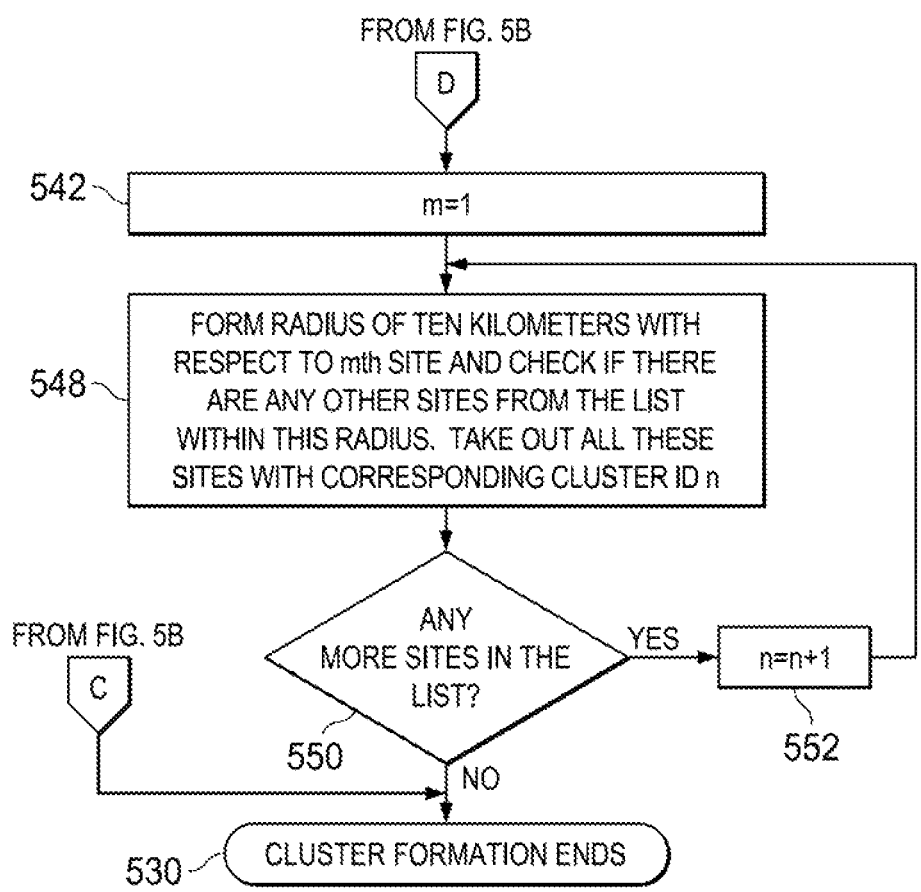

FIGS. 5A-5C is a flowchart illustrating the basic steps of an exemplary cluster formation operation 210 that can be implemented by the scrambling code planning device 200 in accordance with an embodiment of the present invention. Beginning at step 502, identify the center coordinates of the region. For example, this can be done by considering the coordinates with the highest latitude and lowest latitude and evaluating the mid-point of these latitudes. Similarly, the same can be done for longitude were consider the highest and lowest longitude and evaluate the mid-point of these longitudes. At step 504, all the sites are sorted in order of increasing distance with reference to the central coordinates. At step 506, select the first site of the sorted list. At step 508, form a radius of x km (e.g., _1_km) around this site and check whether there are at least 16 sites within this radius. At step 510, determine if the number of sites is less than 16. If the result of step 510 is yes, then at step 512 move this-site to the parking lot and proceed to the next site in the sorted list where the sorted list is the original list formed in order of increasing distances from the reference coordinates. At step 514, modify the sorted list without considering the parked site(s) and then proceed to step 516. For example, the sorted list can be modified by increasing distance. If the result of step 510 is no, then at step 518 take out a list of 17 sites (first site plus closest 16 sites) from sorted list and assign a cluster number (n). At step 520, increase cluster number n =n+1 and proceed to step 516. At step 516, determine if all sites have been traversed. If the result of step 516 is no, then return to step 506. If the result of step 516 is yes, then determine at step 522 if x<5 and there are sites in the parking lot where x is the initial radius. If the result of step 522 is yes, then at step 524 increment x=x+1. At step 526, sort the parked sites in ascending order of distances from center and proceed to step 506. If result of step 522 is no, then at step 528 determine if there are any sites in the parking lot. If the result of step 528 is no, then at step 530 the cluster formation ends. If the result of step 528 is yes, then at step 532 set k=1 where k is the index to the sorted list of sites still in parking lot. At step 534, find the closest cluster to the kth point within a certain distance (e.g., 4km) radius of the kth point. At step 536, determine if the closest cluster has less than 21 sites. If the result of step 536 is yes, then at step 538 take the kth site from the list and assign a corresponding cluster identification. At step 540, determine if end of the list. If the result of step 540 is no, then proceed to step 534. If the result of step 540 is yes, then proceed to step 542. If the result of step 536 is no, then at step 544 determine if end of list. If the result of step 544 is no, then at step 546 increment k=k+1 and proceed to step 534. If the result of step 544 is yes, then at step 542 set m =1 where m is the index to the list of sites which could not be incorporated to any of the existing clusters. At step 548, form a radius of a certain distance (e.g., 10 km) with respect to the mth site and check if there are any other sites from the list within this radius and take out all these sites with corresponding cluster identification n. At step 550, determine if anymore sites in the list. If result of step 550 is yes, then at step 552 increment n=n+1 and proceed to step 548. If to the result of step 550 is no, then proceed to step 530.

Set Allocation Operation 212

Once the cluster formation operation 210 is over, the next phase i.e. allocation of a PSC Set to each cluster commences. Out of the eight possible PSC sets, set 0 is reserved for IBS, new site, boomer cells and some atypical cases to help resolve a tier-1 PSC conflict. So, the initial set allocation is done based on the remaining PSC sets (including PSC sets, 2, . . . 7).

The set allocation operation is described next with the aid of TABLE 4.

TABLE 4

| SOURCE CLUSTER | NEIGHBOR CLUSTER | | | | | | | | | |
|---|---|---|---|---|---|---|---|---|---|---|
| 1 | 5 | 7 | 16 | 33 | 51 | — | — | — | — | — |
| 2 | 11 | 29 | 67 | 92 | | | | | | |
| 3 | | | | | | | | | | |
| 4 | | | | | | | | | | |
| 5 | | | | | | | | | | |
| 6 | | | | | | | | | | |
| 7 | | | | | | | | | | |
| 8 | | | | | | | | | | |
| — | | | | | | | | | | |
| — | | | | | | | | | | |
| — | | | | | | | | | | |
| — | | | | | | | | | | |

Figure 6:
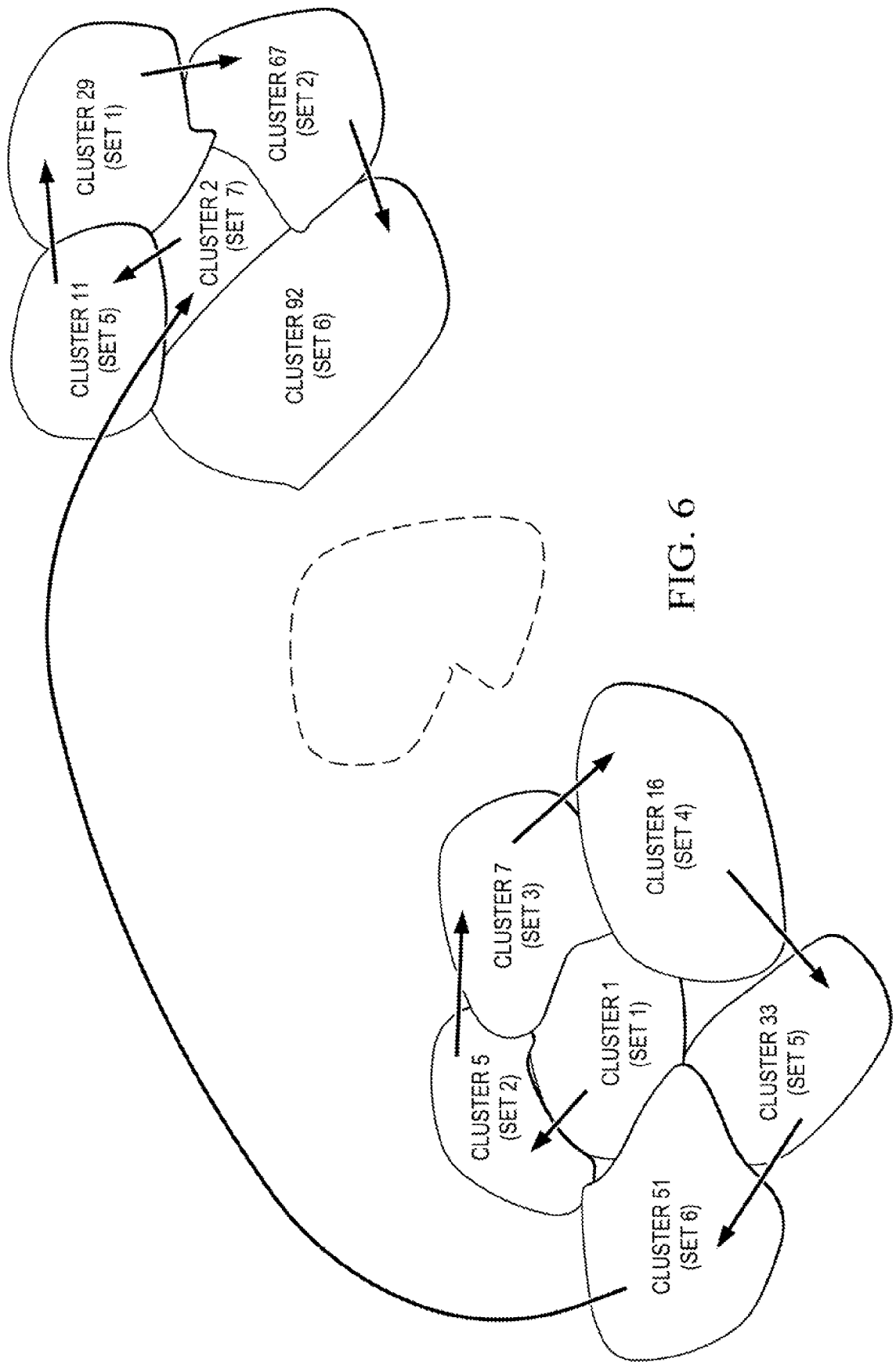
FIG. 6 is a diagrams used to help explain how the exemplary scrambling code planning device can perform a set allocation operation in accordance with an embodiment of the present invention.

The set allocation operation 212 identifies the neighbor relation for each cluster based on adjacencies and creates a neighbor table (e.g., TABLE 4). Then, the set allocation operation 212 begins with the first cluster and assigns PSC set 1 to the first cluster. The allocation of PSC sets is done for the remaining clusters after checking the neighbor relation of the adjoining clusters. Based on the set allocated to the neighbor clusters, the source cluster is then allocated a PSC set selected from set 1-set 7 in such a way so as not to use the set allocation of any of the adjacent clusters as far as practicable. FIG. 6 is a diagram that depicts the PSC set allocation for clusters per the example associated with TABLE 4. The arrows show the order in which the clusters are assigned the PCS sets. The PSC sets 1-8 are indicative of the specific code group allotted to each cluster (example only).

Figure 7A:
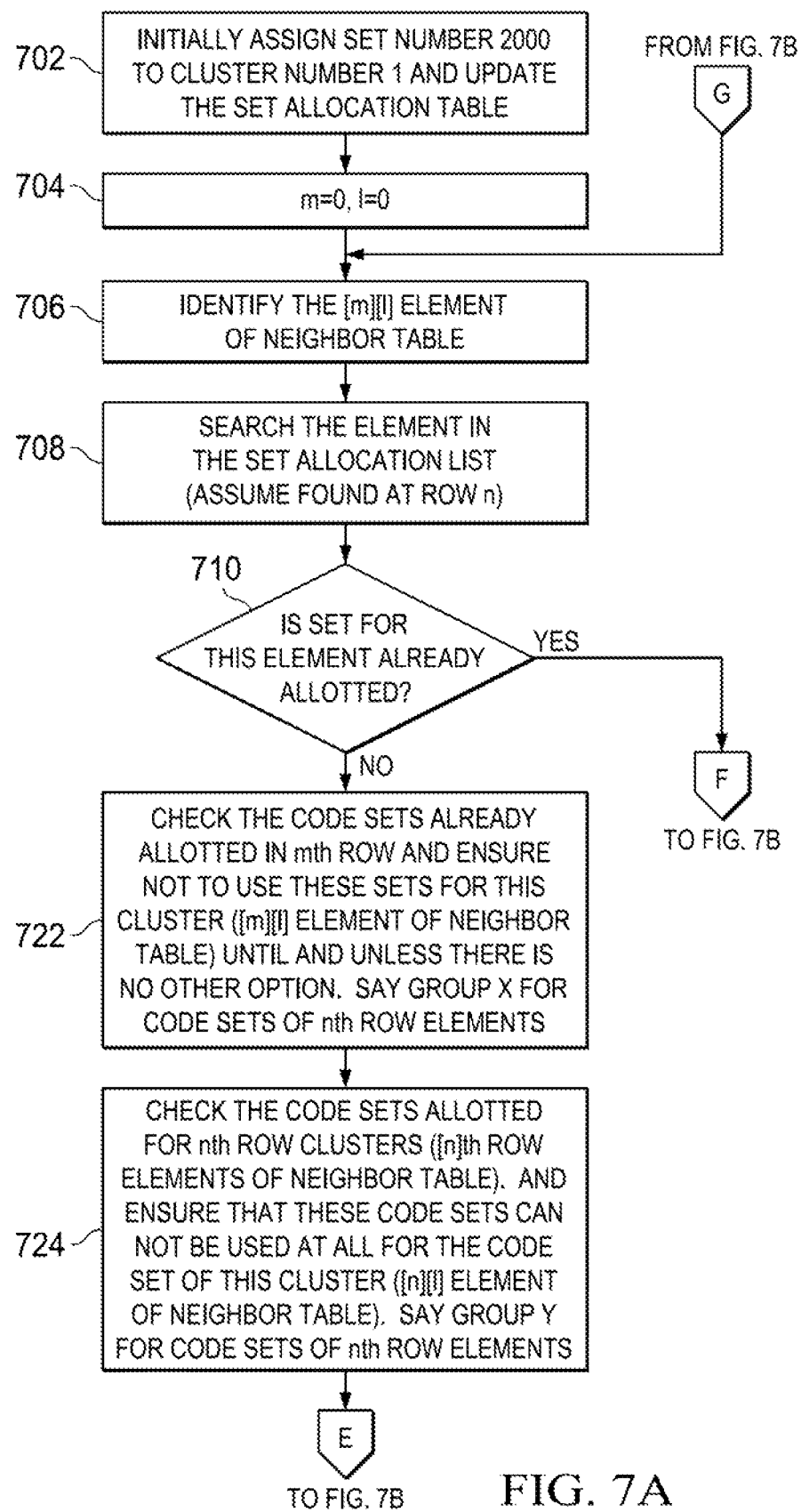
FIGS. 7A-7B is a flowchart illustrating the basic steps of an exemplary set allocation operation that can be implemented by the exemplary scrambling code planning device in accordance with an embodiment of the present invention.
Figure 7B:
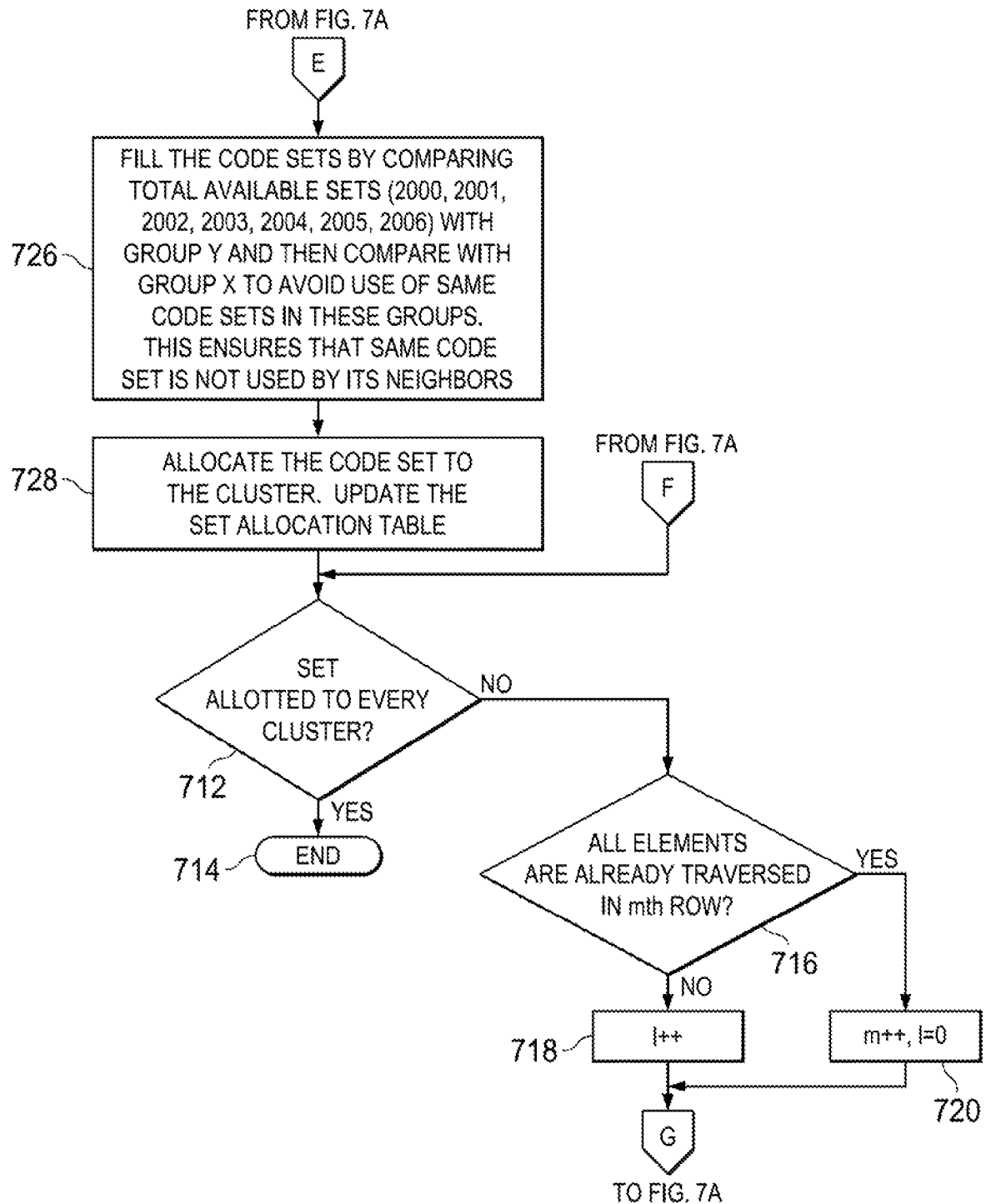

FIGS. 7A-7B is a flowchart illustrating the basic steps of an exemplary set allocation operation 212 that can be implemented by the scrambling code planning device 200 in accordance with an embodiment of the present invention. Beginning at step 702, initially assign a set # (e.g., set #2000) to cluster no. 1 and update the set allocation table. At step 704, set m=0 and 1=0 where m is the row index to the neighbor table depicted in TABLE 4 and 1 is the column index to the neighbor table depicted in TABLE 4. At step 706, identify the [m][1] element in the neighbor table. At step 708, search the element in the set allocation list (assume found at row n). At step 710, determine if set for this element is already allocated. If the result of step 710 is yes, then at step 712 determine if there is a set allotted to every cluster. If the result of step 712 is yes, then at step 714 end. If the result of step 712 is no, then at step 716 determine if all elements are already traversed in mth row. If the result of step 716 is no, then at step 718 set 1++ (1++=>1=1+1) and proceed to step 706. If the result of step 716 is yes, then at step 720 set m++ (m++=>m=1+1) and 1 =0 and proceed to step 706. If result of step 710 is no, then at step 722 check the code sets already allocated in mth row and ensure not to use these sets for this cluster ([m][1] element of neighbor table) until and unless there is no other option. Say group X for code sets of nth row elements. At step 724, check the code sets allotted for nth row clusters ([n]th row elements of neighbor table) and ensure that these code sets can not be used at all for the code set of this cluster ([n][1] element of neighbor table). Say group Y for code sets of nth row elements. At step 726, fill the code sets by comparing total available sets (2000, 2001, 2002, 2003, 2004, 2005, 2006) with group Y and then compare with group X to avoid use of same code sets in these groups. This ensures that same code set is not used by its neighbors. At step 728, allocate the code set to the cluster, update the set allocation table and proceed back to step 712.

Figure 8:
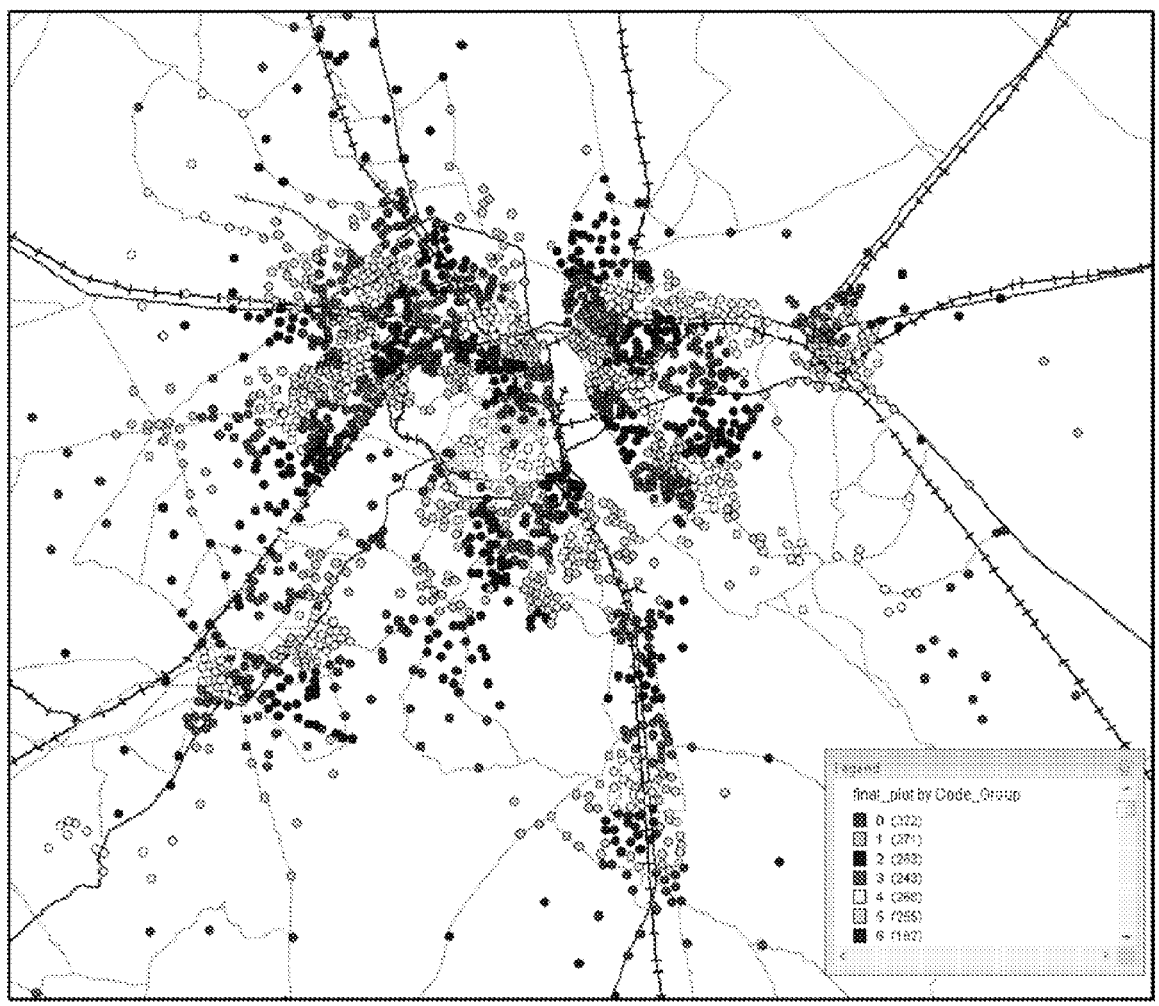
FIG. 8 depicts an exemplary map of clusters which have sites marked so as to indicate the code group assigned thereto after the exemplary scrambling code planning device implements the set allocation operation.

FIG. 8 depicts an exemplary map of clusters which have sites marked so as to indicate the code group that was assigned thereto after the exemplary scrambling code planning device 200 implements the set allocation operation 212.

PSC Allocation Operation 214

After the PSC set allocation operation 212 is complete, the final stage of PSC allocation starts. The main features followed in this phase are as follows:

Identify the clusters having the same PSC Set allocated.

Assign the PSCs in such a way so as to maintain the maximum average separation between the same PSC.

Between two clusters using the same PSC set allocation, PSCs are allocated in such a way to have minimum overlap in the PSC usage pattern. For example, this can be achieved by allocating PSCs 1,9,17,25,33,41,49, . . . for one cluster and 497,489,481,473, . . . for another cluster, both of which are assigned the same PSC Set.

Try to maintain at least 4 tier separations between PSC reuse. In case it is not possible, reduce the tier criteria by 1. However, the same PSC is never to be reused if there is less than 1 tier separation between the sites. In this case, first the PSCs between the two clusters are shuffled to create at least 1 tier separation between successive co-PSC allocations. If that is not possible, then take PSC(s) from the reserve set (i.e. PSC Set 0) to resolve the deadlock.

FIG. 9 is a diagram which illustrates features of the PSC allocation operation 214 where the sites within the clusters 902 and 904 have the same allocated PSC set.

Figure 10A:
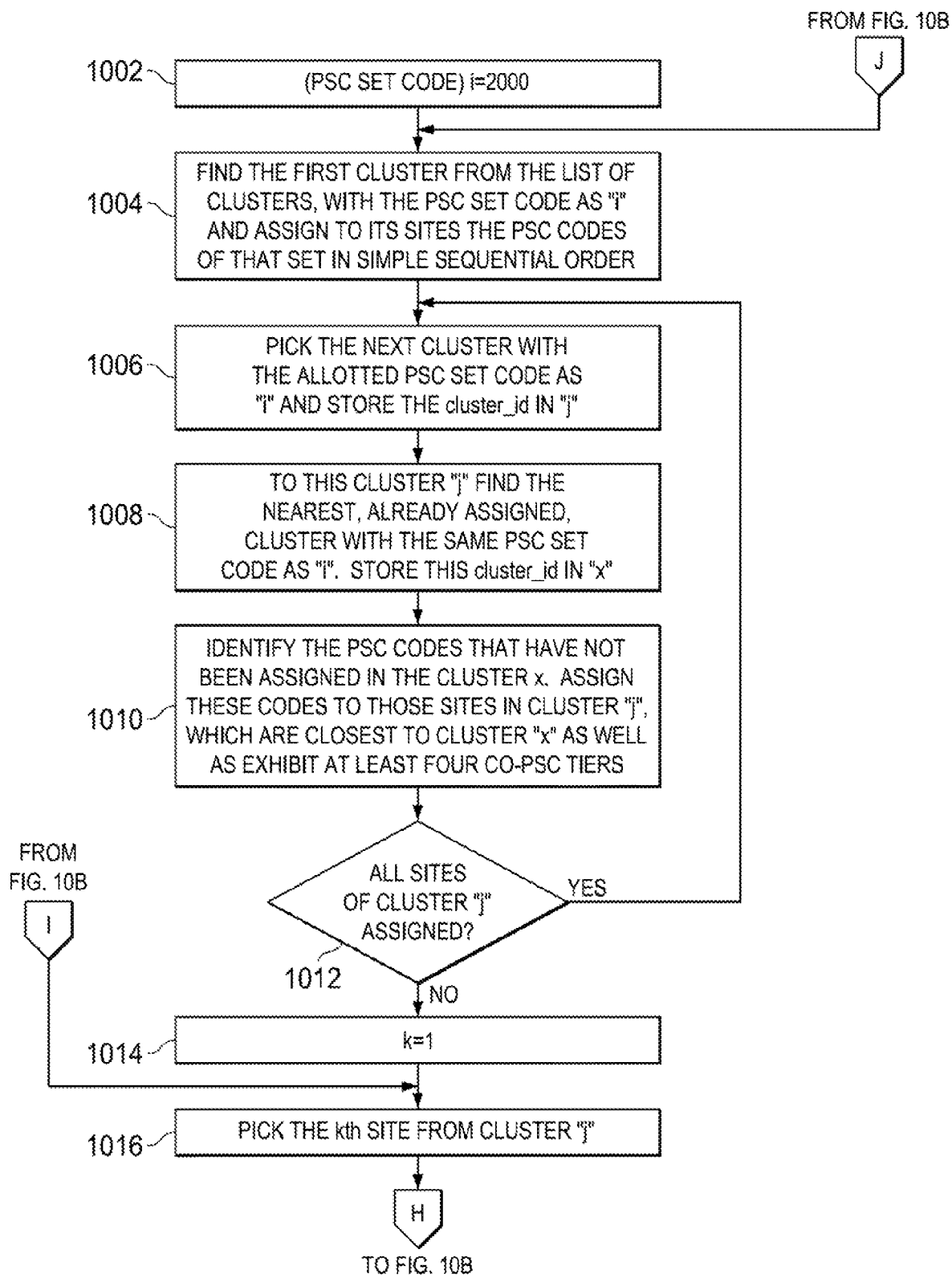
FIGS. 10A-10B is a flowchart illustrating the basic steps of an exemplary PSC allocation operation that can be implemented by the exemplary scrambling code planning device in accordance with an embodiment of the present invention.
Figure 10B:
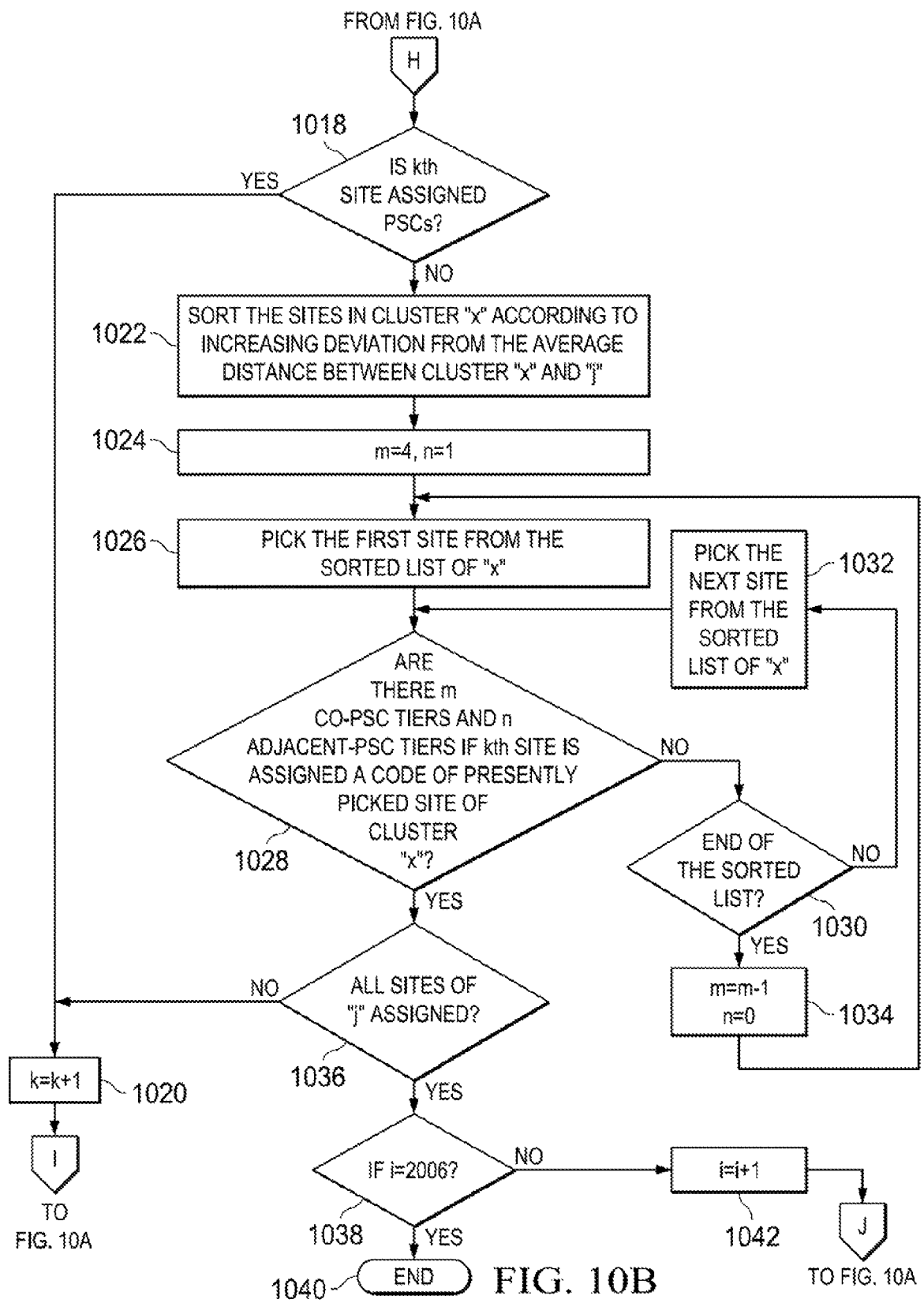

FIGS. 10A-10B is a flowchart illustrating the basic steps of an exemplary PSC allocation operation 214 that can be implemented by the scrambling code planning device 200 in accordance with an embodiment of the present invention. Beginning at step 1002, set i=2000 (PSC set code). At step 1004, find the first cluster from the list of clusters with the PSC code set as "i" and assign to its sites the PSC codes of that set in simple sequential order. At step 1006, pick the next cluster with the allotted PSC code set as "i" and store the cluster identification in "j". At step 1008, with respect to this cluster "j" find the nearest, already assigned, cluster with the same PSC set code and store that cluster identification in "x". At step 1010, identify the PSC codes that have not been assigned in the cluster "x" and assign these codes to those sites in cluster "j" which are closest to cluster "x" as well as exhibit at least 4 co-PSC tiers. At step 1012, determine if all sites of cluster "j" are assigned. If the result of step 1012 is yes, then proceed to step 1006. If the result of step 1012 is no, then at step 1014 set k=1. At step 1016, pick the kth site from cluster "j". At step 1018, determine if the kth site is assigned PSC. If result of step 1018 is yes, then at step 1020 increment k=k+1 and proceed to step 1016. If the result of step 1018 is no, then at step 1022 sort the sites in cluster "x" according to increasing deviation from the average distance between cluster "x" and "j". At step 1024, set m=4 and n=1 where m and n are counters used for monitoring the tier separation. At step 1026, pick the first site from the sorted list of "x". At step 1028, determine if there are m co-PSC tiers and n adjacent PSC tiers if the kth site is assigned a code of a presently picked site of cluster "x". If the result of step 1028 is no, then at step 1030 determine if end of the sorted list. If the result of step 1030 is no, then at step 1032 pick the next site from the sorted list of "x" and proceed to step 1028. If the result of step 1030 is yes, then at step 1034 decrement m=m−1 and set n=0 and proceed to step 1026. If the result of step 1028 is yes, then at step 1036 determine if all sites of "j' are assigned PSCs. If the result of step 1036 is no, then proceed to step 1020. If the result of step 1036 is yes, then at step 1038 determine if i=2006. If the result of step 1038 is yes then end at step 1040. If the result of step 1038 is no, then at step 1042 increment i=i+1 and proceed to step 1004.

Exemplary Wireless Communication Network

Figure 11:
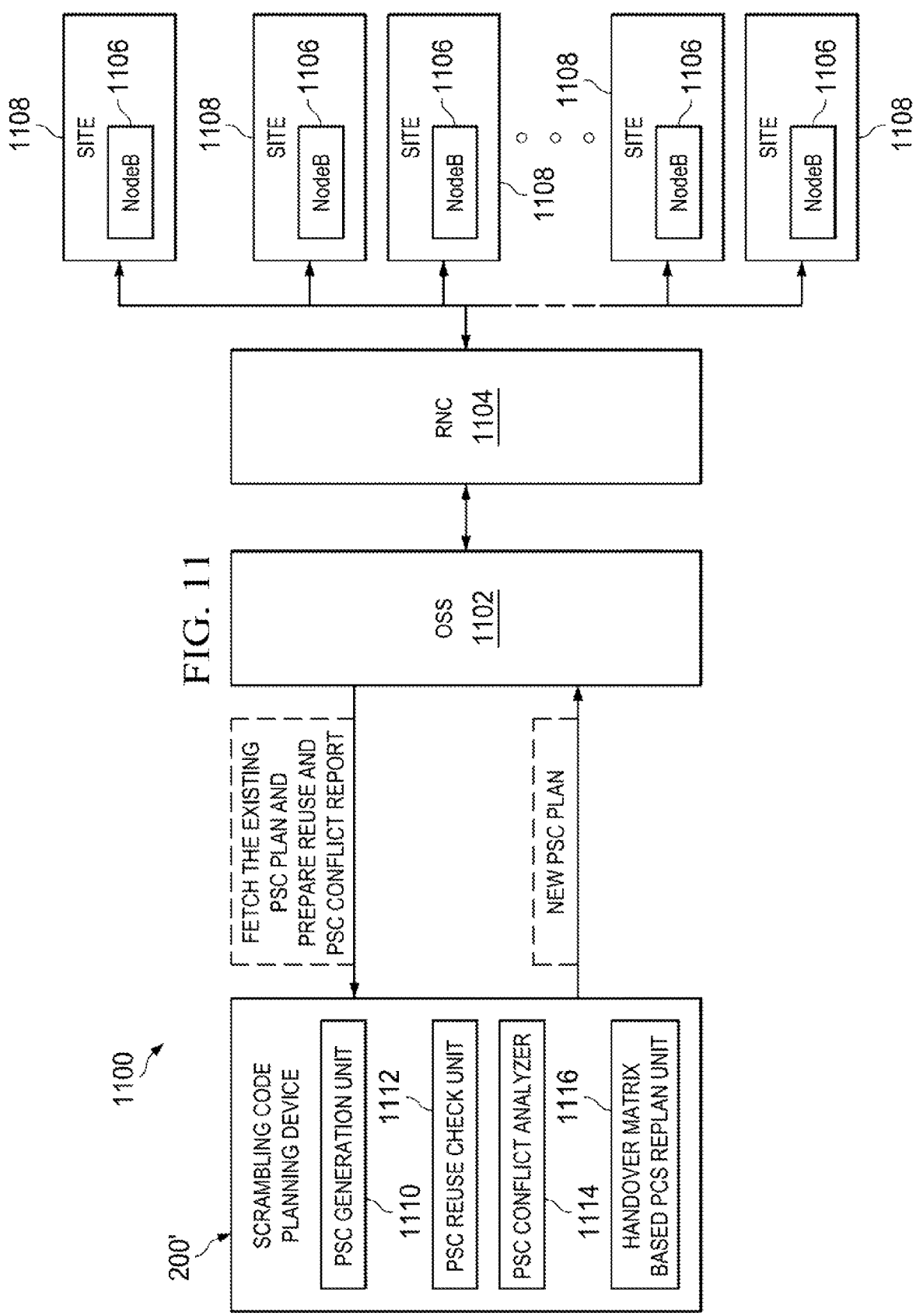
FIG. 11 is a block diagram of an exemplary wireless communication network that incorporates an enhanced scrambling code planning device configured in accordance with an embodiment of the present invention.

Referring to FIG. 11, there is a block diagram of an exemplary wireless communication network 1100 that incorporates an enhanced scrambling code planning device 200' configured in accordance with an embodiment of the present invention. The exemplary wireless network 1100 includes the scrambling code planning device 200 which interfaces with an operational support system 1102 (OSS 1102). The OSS 1102 interfaces with a controller 1104 (e.g., RNC 1104). The controller 1104 interfaces with multiple nodes 1106 (e.g., Node Bs 1106). Each node 1106 manages a site 1108 (cell 1108). In this example, the scrambling code planning device 200' in addition to including the input unit 202, the output unit 204, the graphical user interface 204, the processor 206, and the memory 208 further includes a PSC generation unit 1110, a PSC reuse check unit 1112, a PSC conflict analyzer 1114, and a handover matrix based PSC replan unit 1116. A detailed discussion is provided below about the function of each of these units 1110, 1112, 1114 and 1116.

The PSC generation unit 1110 operates to allocate primary scrambling codes to sites 1108 as described above by: (a) forming a plurality of clusters, wherein each cluster includes one or more of the sites 1108 of the wireless communications network 1100, and wherein each cluster will not include more than a first predetermined number of sites (cluster formation operation 210); (b) allocating one of a plurality of primary scrambling code sets to each of the formed clusters, wherein there are a predetermined number of primary scrambling code sets and each primary scrambling code set includes a predetermined number of the primary scrambling codes (set allocation operation 212); and (c) allocating to the sites in each of the formed clusters which have the same primary scrambling code set allocated thereto the predetermined number of the primary scrambling codes associated with the same primary scrambling code set (PSC allocation operation 214). TABLE 5 illustrates a sample output of the PSC generation unit 1110:

TABLE 5

| SITEID | LONGITUDE | LATITUDE | PSC_APLHA_SEC | PSC_BETA_SEC | PSC_GAMMA_SEC |
|---|---|---|---|---|---|
| ZAMRUD1 | 77.23633 | 28.556388 | 1 | 9 | 17 |
| LJPNGR1 | 77.236944 | 28.561056 | 25 | 33 | 41 |
| KSHCOL1 | 77.241167 | 28.552583 | 49 | 57 | 65 |
| AMRCOL1 | 77.24227 | 28.56077 | 73 | 81 | 89 |
| GKLSH11 | 77.23686 | 28.5493 | 97 | 105 | 113 |
| NTLPRK1 | 77.23522 | 28.56383 | 121 | 129 | 137 |
| GKIBLK1 | 77.23316 | 28.54921 | 145 | 153 | 161 |
| SRFORT1 | 77.226861 | 28.554611 | 169 | 177 | 185 |
| ESTKSH1 | 77.245833 | 28.558111 | 193 | 201 | 209 |
| SDQNGR1 | 77.227111 | 28.559111 | 217 | 225 | 233 |
| GKEBLK1 | 77.24202 | 28.54896 | 241 | 249 | 257 |
| NIRMAL1 | 77.24482 | 28.56401 | 265 | 273 | 281 |
| AMRITP1 | 77.250889 | 28.556722 | 289 | 297 | 305 |
| GARHEE1 | 77.25041 | 28.56023 | 313 | 321 | 329 |
| LAJPAT1 | 77.2426 | 28.5682 | 337 | 345 | 353 |
| LAJPT21 | 77.2474 | 28.566 | 361 | 369 | 377 |
| PAMPOS1 | 77.24694 | 28.54513 | 385 | 393 | 401 |
| CHRGDI1 | 77.229278 | 28.542139 | 4 | 12 | 20 |
| CHRGMK1 | 77.228361 | 28.540139 | 28 | 36 | 44 |
| SOMNGR1 | 77.22475 | 28.54274 | 52 | 60 | 68 |
| CHRGDL1 | 77.225639 | 28.538028 | 76 | 84 | 92 |
| CHIRAG1 | 77.230833 | 28.536694 | 100 | 108 | 116 |
| SAVTNG1 | 77.220583 | 28.540028 | 124 | 132 | 140 |
| GKLSH31 | 77.238361 | 28.537306 | 148 | 156 | 164 |
| WINSRP1 | 77.218222 | 28.542361 | 172 | 180 | 188 |
| SAVTRI1 | 77.217362 | 28.539528 | 196 | 204 | 212 |

The PSC reuse check unit 1112 interacts with the OSS 1102 to fetch the existing PSC plan and then prepares a PSC reuse summary. In particular, the PSC reuse check unit 1112 can take any existing PSC allocation for a given market and calculate a reuse factor for any given PSC as well as the distance and tier corresponding to each reuse of the PSC. This helps to understand how the PSCs have been reused in a given market area and which PSCs can be used for future allocation (in case there are no reserved PSCs for future growth). TABLE 6 illustrates a sample output of the PSC reuse check unit 1112:

TABLE 6

| Source | Target | PSC | PSC_RE-USED | TIER | DIS-TANCE_Km |
|---|---|---|---|---|---|
| ZAMRUD1 | LALITA1 | 1 | 9 | 11 | 9.02 |
| ZAMRUD1 | JAITPR1 | 1 | 9 | 16 | 10.31 |
| ZAMRUD1 | SOUPTL1 | 1 | 9 | 11 | 12.11 |
| ZAMRUD1 | SANTGR1 | 1 | 9 | 20 | 17.77 |
| ZAMRUD1 | GURG141 | 1 | 9 | 20 | 20.62 |
| ZAMRUD1 | SHLIBG1 | 1 | 9 | 30 | 19.96 |
| ZAMRUD1 | MAHPAL1 | 1 | 9 | 11 | 10.6 |
| ZAMRUD1 | ASALAT1 | 1 | 9 | 32 | 23.14 |
| LALITA1 | JAITPR1 | 1 | 9 | 7 | 15.26 |
| LALITA1 | SOUPTL1 | 1 | 9 | 16 | 10.78 |
| LALITA1 | SANTGR1 | 1 | 9 | 32 | 18.16 |
| LALITA1 | GURG141 | 1 | 9 | 19 | 28.13 |
| LALITA1 | SHLIBG1 | 1 | 9 | 19 | 15.19 |
| LALITA1 | MAHPAL1 | 1 | 9 | 10 | 16.93 |
| LALITA1 | ASALAT1 | 1 | 9 | 20 | 14.35 |
| JAITPR1 | SOUPTL1 | 1 | 9 | 21 | 22.19 |
| JAITPR1 | SANTGR1 | 1 | 9 | 42 | 28.08 |
| JAITPR1 | GURG141 | 1 | 9 | 20 | 26.8 |
| JAITPR1 | SHLIBG1 | 1 | 9 | 41 | 29.36 |
| JAITPR1 | MAHPAL1 | 1 | 9 | 10 | 19.46 |
| JAITPR1 | ASALAT1 | 1 | 9 | 27 | 25.94 |
| SOUPTL1 | SANTGR1 | 1 | 9 | 20 | 7.4 |
| SOUPTL1 | GURG141 | 1 | 9 | 11 | 22.18 |
| SOUPTL1 | SHLIBG1 | 1 | 9 | 15 | 8.59 |
| SOUPTL1 | MAHPAL1 | 1 | 9 | 3 | 11.42 |
| SOUPTL1 | ASALAT1 | 1 | 9 | 27 | 22.02 |
| SANTGR1 | GURG141 | 1 | 9 | 19 | 19.96 |
| SANTGR1 | SHLIBG1 | 1 | 9 | 19 | 10.49 |
| SANTGR1 | MAHPAL1 | 1 | 9 | 9 | 12.03 |
| SANTGR1 | ASALAT1 | 1 | 9 | 37 | 28.7 |
| GURG141 | SHLIBG1 | 1 | 9 | 34 | 29.61 |
| GURG141 | MAHPAL1 | 1 | 9 | 10 | 11.36 |
| GURG141 | ASALAT1 | 1 | 9 | 38 | 42.29 |
| SHLIBG1 | MAHPAL1 | 1 | 9 | 22 | 19.64 |
| SHLIBG1 | ASALAT1 | 1 | 9 | 14 | 20.59 |
| MAHPAL1 | ASALAT1 | 1 | 9 | 33 | 30.96 |
| SOUEXT1 | NOID8E1 | 2 | 13 | 19 | 10.38 |
| SOUEXT1 | GFRMKT1 | 2 | 13 | 12 | 9.76 |

The PSC conflict analyzer 1114 uses the existing PSC plan to compute tier 1 and tier 2 PSC conflicts to identify sites where PSC change is required. In particular, the PSC conflict analyzer 1114 performs a basic health check of the existing PSC plan based on the neighbor list defined in the wireless network system 1100. The PSC conflict analyzer 1114 calculates the tier 1 and tier 2 PSC conflicts and gives the relations causing the conflict. TABLES 7A and 7B illustrates the sample tier 1 and tier 2 PSC conflicts output from the PSC conflict analyzer 1114:

TABLE 7A

| Source Cell | Source PSC | Target Cell | Target PSC |
|---|---|---|---|
| UM10336 | 32 | UM10337 | 40 |
| UM10336 | 32 | UM10338 | 48 |
| UM10336 | 32 | UM11018 | 32 |
| UM10336 | 32 | UM11547 | 62 |
| UM10336 | 32 | UM12618 | 67 |
| UM10336 | 32 | UM14367 | 134 |
| UM10336 | 32 | UM14368 | 142 |
| UM10336 | 32 | UM14658 | 163 |
| UM10336 | 32 | UM14706 | 200 |
| UM10336 | 32 | UM14707 | 208 |
| UM10336 | 32 | UM42408 | 358 |

TABLE 7A indicates a Tier 1 PSC conflict where a source cell (site) and target cell (site) have the same PSC allocated (in the example, source cell UM10336 and Target Cell UMI 1018 have the same PSC 32).

TABLE 7B

| Source Cell | Source PSC | Target Cell | Target PSC |
|---|---|---|---|
| UM10336 | 32 | UM10337 | 40 |
| UM10336 | 32 | UM10338 | 48 |
| UM10336 | 32 | UM11018 | 19 |
| UM10336 | 32 | UM11547 | 62 |
| UM10336 | 32 | UM12618 | 67 |
| UM10336 | 32 | UM14367 | 134 |
| UM10336 | 32 | UM14368 | 142 |
| UM10336 | 32 | UM14658 | 163 |
| UM10336 | 32 | UM14706 | 200 |
| UM10336 | 32 | UM14707 | 62 |
| UM10336 | 32 | UM42408 | 358 |

TABLE 7B indicates a Tier 2 PSC conflict where targets cells (sites) corresponding to the same source cell (site) have the same PSC allocated (in the example, Target Cells UM 11547 and UM14707 corresponding to the same Source Cell UM10336 have the same PSC 62).

The handover matrix based PSC replan unit 1116 can operate to create a new PSC plan by correlating the tier two conflicts and the handover matrix data. The handover matrix data is a table including source cells and target cells (i.e. neighbor relations) with corresponding soft handover in attempts per relation. In particular, the handover matrix based PSC replan unit 1116 will use the current PSC plan, the current neighbor list (NL), and the handover matrix (containing handover attempts) to create an optimal PSC plan which has the least number of PSC conflicts.

The skilled person will appreciate that the exemplary wireless communication system 1100, the OSS 1102, the controller 1104, and the nodes 1106 all include many other components which are well known to those skilled in the art but for clarity are not described herein while the components of the scrambling code planning device 200 which are relevant to the present invention have been described in detail herein. In addition, the skilled person will appreciate that the present invention can be used in any type of wireless communication system such as for example a UMTS, HSDPA or HSUPA system in which scrambling codes need to be allocated to sites.

From the foregoing, one skilled in the art can readily appreciate that the present invention described herein enables the scrambling code planning device 200 and 200' and the corresponding method for allocating primary scrambling codes to sites (e.g., Node B sites) within a wireless communication network 1100. In one embodiment, the scrambling code planning device 200 and 200' includes the input unit 202, the output unit 204, the graphical user interface 205, the processor 206, and the memory 208. In particular, the processor 206 is configured to interface with the memory 208 and execute processor-executable instructions stored therein to allocate primary scrambling codes to sites (e.g., Node B sites) within a wireless communication network by: (a) forming a plurality of clusters, wherein each cluster includes one or more of the sites of the wireless communications network, and wherein each cluster will not include more than a first predetermined number of sites (cluster formation operation 210); (b) allocating one of a plurality of primary scrambling code sets to each of the formed clusters, wherein there area predetermined number of primary scrambling code sets and each primary scrambling code set includes a predetermined number of the primary scrambling codes (set allocation operation 212); and (c) allocating to the sites in each of the formed clusters which have the same primary scrambling code set allocated thereto the predetermined number of the primary scrambling codes associated with the same primary scrambling code set (PSC allocation operation 214).

To perform the cluster formation operation 210, the processor 206 can interface with the memory 208 and execute the processor-executable instructions to: (i) initially form the plurality of clusters by placing a second predetermined number of sites into each cluster, wherein the first predetermined number of sites is larger than the second predetermined number of sites; (ii) absorb any non-placed sites into one or more of the initially formed clusters taking into account proximity of the non-placed sites with respect to the initially formed clusters while ensuring each of the initially formed clusters which absorb the non-placed sites do not include more than the first predetermined number of sites; and (iii) if there still remains non-placed sites after the absorbing step, then forming a new cluster in which the remaining non-placed sites are placed so long as the new cluster does not include more than the first predetermined number of sites.

To perform the set allocation operation 212, the processor 206 can interface with the memory 208 and execute the processor-executable instructions to: (i) create a neighboring table which identifies neighboring clusters associated with each of a plurality of source clusters, where the source clusters and the neighboring clusters make-up the formed clusters; and (ii) allocate one of the primary scrambling code sets to each of the source clusters so as not to use anyone of the primary scrambling code sets that was allocated to the associated neighboring clusters.

To perform the PSC allocation operation 214, the processor 206 can interface with the memory 208 and execute the processor-executable instructions to: (i) identify the formed clusters that have been allocated the same primary scrambling code set; and (ii) assign the predetermined number of primary scrambling codes associated with the same primary scrambling code set to the sites in the identified formed clusters in a manner that maintains a maximum tier separation when reusing the same primary scrambling codes. For example, the processor 206 can assign the primary scrambling codes by maintaining at least a predetermined number of tier separation when reusing the same primary scrambling codes in the identified formed clusters and if not possible then maintain a lower predetermined number of tier separation when reusing the same primary scrambling codes in the identified formed clusters and if this is not possible and a single tier separation is not possible without reusing the same primary scrambling codes in the identified formed clusters then the primary scrambling codes are shuffled between the identified formed clusters in an attempt to create at least one tier separation between successive co-primary scrambling codes allocations and if this is not possible then use the primary scrambling codes from a reserved primary scrambling code set.

The scrambling code planning device 200 and 200' has many advantages some of which are as follows:
Complete in-house solution and does not call for the need to procure any external planning tool for PSC planning.
The entire coding can been done using Java which makes it platform independent and relatively easy to install.
Inputs are fairly simple. Only cell_id and site co-ordinates are required.
The scrambling code planning device 200 and 200' can use TABLES 3A and 3B (for example) and allocate the PSCs belonging to different code group so that the maximum distance and at least two tier separation between the cells having the same PSC is achieved.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A scrambling code planning device for allocating a plurality of primary scrambling codes to sites within a wireless communication network, the scrambling code planning device comprising:
a processor; and
a memory that stores processor-executable instructions therein where the processor interfaces with the memory and executes the processor-executable instructions to enable the following:
forming a plurality of clusters, wherein each cluster comprises one or more of the sites of the wireless communications network, and wherein each cluster will not comprise more than a first predetermined number of sites;
allocating one of a plurality of primary scrambling code sets to each of the formed clusters, wherein there are a predetermined number of primary scrambling code sets and each primary scrambling code set comprises a predetermined number of the primary scrambling codes;
allocating to the one or more sites in each of the formed clusters, which have the same primary scrambling code set allocated thereto, the predetermined number of the primary scrambling codes associated with the same primary scrambling code set;
wherein the processor further executes the processor-executable instructions in the memory to perform the second allocating operation by:
identifying the formed clusters that have been allocated the same primary scrambling code set; and
assigning the predetermined number of primary scrambling codes associated with the same primary scrambling code set to the sites in the identified formed clusters in a manner that maintains a maximum tier separation when reusing the same primary scrambling codes;
wherein the processor further executes the processor-executable instructions in the memory to perform the assigning operation by:
maintaining at least a predetermined number of tier separation when reusing the same primary scrambling codes in the identified formed clusters and if not possible then maintain a lower predetermined number of tier separation when reusing the same primary scrambling codes in the identified formed clusters and if this is not possible and a single tier separation is not possible without reusing the same primary scrambling codes in the identified formed clusters then the primary scrambling codes are shuffled between the identified formed clusters in an attempt to create at least one tier separation between successive co-primary scrambling codes allocations and if this is not possible then use the primary scrambling codes from a reserved primary scrambling code set.

2. The scrambling code planning device of claim 1, wherein there are eight primary scrambling code sets and each primary scrambling code set comprises sixty four primary scrambling codes.

3. The scrambling code planning device of claim 1, wherein during the first allocating operation one of the plurality of primary scrambling code sets is reserved and not allocated to the formed clusters.

4. The scrambling code planning device of claim 1, wherein the processor further executes the processor-executable instructions in the memory to perform the forming operation by:
  initially forming the plurality of clusters by placing a second predetermined number of sites into each cluster, wherein the first predetermined number of sites is larger than the second predetermined number of sites;
  absorbing any non-placed sites into one or more of the initially formed clusters taking into account proximity of the non-placed sites with respect to the initially formed clusters while ensuring each of the initially formed clusters which absorb the non-placed sites do not comprise more than the first predetermined number of sites; and
  if there still remains non-placed sites after the absorbing step, then forming a new cluster in which the remaining non-placed sites are placed so long as the new cluster does not comprise more than the first predetermined number of sites.

5. The scrambling code planning device of claim 4, wherein the first predetermined number of sites is twenty one sites and the second predetermined number of sites is seventeen sites.

6. The scrambling code planning device of claim 1, wherein the processor further executes the processor-executable instructions in the memory to perform the first allocating operation by:
  creating a neighboring table which identifies neighboring clusters associated with each of a plurality of source clusters, where the source clusters and the neighboring clusters make-up the formed clusters; and
  allocating one of the primary scrambling code sets to each of the source clusters so as not to use anyone of the primary scrambling code sets that was allocated to the associated neighboring clusters.

7. A method for allocating a plurality of primary scrambling codes to sites within a wireless communication network, the method in a scrambling code planning device comprising steps of:
  forming a plurality of clusters, wherein each cluster comprises one or more of the sites of the wireless communications network, and wherein each cluster will not comprise more than a first predetermined number of sites;
  allocating one of a plurality of primary scrambling code sets to each of the formed clusters, wherein there are a predetermined number of primary scrambling code sets and each primary scrambling code set comprises a predetermined number of the primary scrambling codes;
  allocating to the one or more sites in each of the formed clusters, which have the same primary scrambling code set allocated thereto, the predetermined number of the primary scrambling codes associated with the same primary scrambling code set;
  wherein the second allocating step further comprises the steps of:
  identifying the formed clusters that have been allocated the same primary scrambling code set; and
  assigning the predetermined number of primary scrambling codes associated with the same primary scrambling code set to the sites in the identified formed clusters in a manner that maintains a maximum tier separation when reusing the same primary scrambling codes; and
  wherein the assigning step further comprises steps of:
  maintaining at least a predetermined number of tier separation when reusing the same primary scrambling codes in the identified formed clusters and if not possible then maintain a lower predetermined number of tier separation when reusing the same primary scrambling codes in the identified formed clusters and if this is not possible and a single tier separation is not possible without reusing the same primary scrambling codes in the identified formed clusters then the primary scrambling codes are shuffled between the identified formed clusters in an attempt to create at least one tier separation between successive co-primary scrambling codes allocations and if this is not possible then use the primary scrambling codes from a reserved primary scrambling code set.

8. The method of claim 7, wherein there are eight primary scrambling code sets and each primary scrambling code set comprises sixty four primary scrambling codes.

9. The method of claim 7, wherein during the first allocating step one of the plurality of primary scrambling code sets is reserved and not allocated to the formed clusters.

10. The method of claim 7, wherein the forming step further comprises steps of:
  initially forming the plurality of clusters by placing a second predetermined number of sites into each cluster, wherein the first predetermined number of sites is larger than the second predetermined number of sites;
  absorbing any non-placed sites into one or more of the initially formed clusters taking into account proximity of the non-placed sites with respect to the initially formed clusters while ensuring each of the initially formed clusters which absorb the non-placed sites do not comprise more than the first predetermined number of sites; and
  if there still remains non-placed sites after the absorbing step, then forming a new cluster in which the remaining non-placed sites are placed so long as the new cluster does not comprise more than the first predetermined number of sites.

11. The method of claim 10, wherein the first predetermined number of sites is twenty one sites and the second predetermined number of sites is seventeen sites.

12. The method of claim 7, wherein the first allocating step further comprises the steps of:
  creating a neighboring table which identifies neighboring clusters associated with each of a plurality of source clusters, where the source clusters and the neighboring clusters make-up the formed clusters; and
  allocating one of the primary scrambling code sets to each of the source clusters so as not to use anyone of the primary scrambling code sets that was allocated to the associated neighboring clusters.

13. A wireless communication network comprising:
an operational support system;
a plurality of nodes each of which manages a site;
a controller coupled to the operational support system and configured to manage the plurality of nodes;
a scrambling code planning device coupled to the operational support system and configured to allocate a plurality of primary scrambling codes to the sites, wherein the scrambling code planning comprises a primary scrambling code generation unit which:
    forms a plurality of clusters, wherein each cluster comprises one or more of the sites, and wherein each cluster will not comprise more than a first predetermined number of sites;
    allocates one of a plurality of primary scrambling code sets to each of the formed clusters, wherein there are a predetermined number of primary scrambling code sets and each primary scrambling code set comprises a predetermined number of the primary scrambling codes; and
    allocates to the one or more sites in each of the formed clusters, which have the same primary scrambling code set allocated thereto, the predetermined number of the primary scrambling codes associated with the same primary scrambling code set;
wherein primary scrambling code generation unit performs the second allocating operation by:
identifying the formed clusters that have been allocated the same primary scrambling code set; and
assigning the predetermined number of primary scrambling codes associated with the same primary scrambling code set to the sites in the identified formed clusters in a manner that maintains a maximum tier separation when reusing the same primary scrambling codes;
wherein primary scrambling code generation unit performs the assigning operation by:
maintaining at least a predetermined number of tier separation when reusing the same primary scrambling codes in the identified formed clusters and if not possible then maintain a lower predetermined number of tier separation when reusing the same primary scrambling codes in the identified formed clusters and if this is not possible and a single tier separation is not possible without reusing the same primary scrambling codes in the identified formed clusters then the primary scrambling codes are shuffled between the identified formed clusters in an attempt to create at least one tier separation between successive co-primary scrambling codes allocations and if this is not possible then use the primary scrambling codes from a reserved primary scrambling code set.

14. The wireless communication network of claim 13, wherein the scrambling code planning device further comprises a primary scrambling code reuse check unit that interacts with the operational support system to fetch an existing primary scrambling code plan and then prepares a primary scrambling code reuse summary by calculating a reuse factor for any given primary scrambling code as well as the distance and tier corresponding to each reuse of the given primary scrambling code.

15. The wireless communication network of claim 13, wherein the scrambling code planning device further comprises a primary scrambling code conflict analyzer that uses an existing primary scrambling code plan to compute tier 1 and tier 2 primary scrambling code conflicts.

16. The wireless communication network of claim 13, wherein the scrambling code planning device further comprises a handover matrix based primary scrambling code replan unit that creates a primary scrambling code plan by correlating tier two conflicts and handover matrix data.

17. A scrambling code planning device for allocating a plurality of primary scrambling codes to sites within a wireless communication network, the scrambling code planning device comprising:
a processor; and
a memory that stores processor-executable instructions therein where the processor interfaces with the memory and executes the processor-executable instructions to enable following operations:
forming a plurality of clusters, wherein each cluster comprises one or more of the sites of the wireless communications network, and wherein each cluster will not comprise more than a first predetermined number of sites, wherein the forming operation comprises:
    initially forming the plurality of clusters by placing a second predetermined number of sites into each cluster, wherein the first predetermined number of sites is larger than the second predetermined number of sites;
    absorbing any non-placed sites into one or more of the initially formed clusters taking into account proximity of the non-placed sites with respect to the initially formed clusters while ensuring each of the initially formed clusters which absorb the non-placed sites do not comprise more than the first predetermined number of sites; and
    if there still remains non-placed sites after the absorbing step, then forming a new cluster in which the remaining non-placed sites are placed so long as the new cluster does not comprise more than the first predetermined number of sites;
allocating one of a plurality of primary scrambling code sets to each of the formed clusters, wherein there are a predetermined number of primary scrambling code sets and each primary scrambling code set comprises a predetermined number of the primary scrambling codes, wherein the allocating operation comprises:
    creating a neighboring table which identifies neighboring clusters associated with each of a plurality of source clusters, where the source clusters and the neighboring clusters make-up the formed clusters; and
    allocating one of the primary scrambling code sets to each of the source clusters so as not to use anyone of the primary scrambling code sets that was allocated to the associated neighboring clusters; and
allocating to the one or more sites in each of the formed clusters, which have the same primary scrambling code set allocated thereto, the predetermined number of the primary scrambling codes associated with the same primary scrambling code set, wherein the allocating operation comprises:
    identifying the formed clusters that have been allocated the same primary scrambling code set; and
    assigning the predetermined number of primary scrambling codes associated with the same primary scrambling code set to the sites in the identified formed clusters in a manner that maintains a maximum tier separation when reusing the same primary scrambling codes, wherein the assigning operation comprises maintaining at least a predetermined number of tier separation when reusing the same primary scrambling codes in the identified formed clusters and if not possible then maintain a lower predetermined number of tier separation when reusing the same primary scrambling codes in the identified formed clusters and if this is not possible and a single tier separation is not possible without reusing the same primary scrambling codes in the identified formed clusters then the primary scrambling codes are shuffled between the identified formed clusters in an attempt to create at least one tier separation between successive co-primary scrambling codes allocations and if this is not possible then use the primary scrambling codes from a reserved primary scrambling code set.

18. A method for allocating a plurality of primary scrambling codes to sites within a wireless communication network, the method in a scrambling code planning device comprising steps of:

forming a plurality of clusters, wherein each cluster comprises one or more of the sites of the wireless communications network, and wherein each cluster will not comprise more than a first predetermined number of sites, wherein the forming step comprises:
  initially forming the plurality of clusters by placing a second predetermined number of sites into each cluster, wherein the first predetermined number of sites is larger than the second predetermined number of sites;
  absorbing any non-placed sites into one or more of the initially formed clusters taking into account proximity of the non-placed sites with respect to the initially formed clusters while ensuring each of the initially formed clusters which absorb the non-placed sites do not comprise more than the first predetermined number of sites; and
  if there still remains non-placed sites after the absorbing step, then forming a new cluster in which the remaining non-placed sites are placed so long as the new cluster does not comprise more than the first predetermined number of sites;

allocating one of a plurality of primary scrambling code sets to each of the formed clusters, wherein there are a predetermined number of primary scrambling code sets and each primary scrambling code set comprises a predetermined number of the primary scrambling codes, wherein the allocating step comprises:
  creating a neighboring table which identifies neighboring clusters associated with each of a plurality of source clusters, where the source clusters and the neighboring clusters make-up the formed clusters; and
  allocating one of the primary scrambling code sets to each of the source clusters so as not to use anyone of the primary scrambling code sets that was allocated to the associated neighboring clusters; and allocating to the one or more sites in each of the formed clusters, which have the same primary scrambling code set allocated thereto, the predetermined number of the primary scrambling codes associated with the same primary scrambling code set, wherein the allocating step comprises:
  identifying the formed clusters that have been allocated the same primary scrambling code set; and
  assigning the predetermined number of primary scrambling codes associated with the same primary scrambling code set to the sites in the identified formed clusters in a manner that maintains a maximum tier separation when reusing the same primary scrambling codes, wherein the assigning operation comprises maintaining at least a predetermined number of tier separation when reusing the same primary scrambling codes in the identified formed clusters and if not possible then maintain a lower predetermined number of tier separation when reusing the same primary scrambling codes in the identified formed clusters and if this is not possible and a single tier separation is not possible without reusing the same primary scrambling codes in the identified formed clusters then the primary scrambling codes are shuffled between the identified formed clusters in an attempt to create at least one tier separation between successive co-primary scrambling codes allocations and if this is not possible then use the primary scrambling codes from a reserved primary scrambling code set.

19. A scrambling code planning device for allocating a plurality of primary scrambling codes to sites within a wireless communication network, the scrambling code planning device comprising:
  a processor; and
  a memory that stores processor-executable instructions therein where the processor interfaces with the memory and executes the processor-executable instructions to enable the following:
    forming a plurality of clusters, wherein each cluster comprises one or more of the sites of the wireless communications network, and wherein each cluster will not comprise more than a first predetermined number of sites;
    allocating one of a plurality of primary scrambling code sets to each of the formed clusters, wherein there are a predetermined number of primary scrambling code sets and each primary scrambling code set comprises a predetermined number of the primary scrambling codes;
    allocating to the one or more sites in each of the formed clusters, which have the same primary scrambling code set allocated thereto, the predetermined number of the primary scrambling codes associated with the same primary scrambling code set; and
  wherein the processor further executes the processor-executable instructions in the memory to perform the forming operation by:
    initially forming the plurality of clusters by placing a second predetermined number of sites into each cluster, wherein the first predetermined number of sites is larger than the second predetermined number of sites;
    absorbing any non-placed sites into one or more of the initially formed clusters taking into account proximity of the non-placed sites with respect to the initially formed clusters while ensuring each of the initially formed clusters which absorb the non-placed sites do not comprise more than the first predetermined number of sites; and
    if there still remains non-placed sites after the absorbing step, then forming a new cluster in which the remaining non-placed sites are placed so long as the new cluster does not comprise more than the first predetermined number of sites.

20. The scrambling code planning device of claim 19, wherein the processor further executes the processor-executable instructions in the memory to perform the second allocating operation by:
  identifying the formed clusters that have been allocated the same primary scrambling code set; and
  assigning the predetermined number of primary scrambling codes associated with the same primary scrambling code set to the sites in the identified formed clusters in a manner that maintains a maximum tier separation when reusing the same primary scrambling codes.

21. The scrambling code planning device of claim 20, wherein the processor further executes the processor-executable instructions in the memory to perform the assigning operation by:

maintaining at least a predetermined number of tier separation when reusing the same primary scrambling codes in the identified formed clusters and if not possible then maintain a lower predetermined number of tier separation when reusing the same primary scrambling codes in the identified formed clusters and if this is not possible and a single tier separation is not possible without reusing the same primary scrambling codes in the identified formed clusters then the primary scrambling codes are shuffled between the identified formed clusters in an attempt to create at least one tier separation between successive co-primary scrambling codes allocations and if this is not possible then use the primary scrambling codes from a reserved primary scrambling code set.

22. A method for allocating a plurality of primary scrambling codes to sites within a wireless communication network, the method in a scrambling code planning device comprising steps of:

forming a plurality of clusters, wherein each cluster comprises one or more of the sites of the wireless communications network, and wherein each cluster will not comprise more than a first predetermined number of sites;

allocating one of a plurality of primary scrambling code sets to each of the formed clusters, wherein there are a predetermined number of primary scrambling code sets and each primary scrambling code set comprises a predetermined number of the primary scrambling codes;

allocating to the one or more sites in each of the formed clusters, which have the same primary scrambling code set allocated thereto, the predetermined number of the primary scrambling codes associated with the same primary scrambling code set;

wherein the forming step further comprises steps of:

initially forming the plurality of clusters by placing a second predetermined number of sites into each cluster, wherein the first predetermined number of sites is larger than the second predetermined number of sites;

absorbing any non-placed sites into one or more of the initially formed clusters taking into account proximity of the non-placed sites with respect to the initially formed clusters while ensuring each of the initially formed clusters which absorb the non-placed sites do not comprise more than the first predetermined number of sites; and if there still remains non-placed sites after the absorbing step, then forming a new cluster in which the remaining non-placed sites are placed so long as the new cluster does not comprise more than the first predetermined number of sites.

23. The method of claim 22, wherein the second allocating step further comprises steps of:

identifying the formed clusters that have been allocated the same primary scrambling code set; and assigning the predetermined number of primary scrambling codes associated with the same primary scrambling code set to the sites in the identified formed clusters in a manner that maintains a maximum tier separation when reusing the same primary scrambling codes.

24. The method of claim 23, wherein the assigning step further comprises the steps of:

maintaining at least a predetermined number of tier separation when reusing the same primary scrambling codes in the identified formed clusters and if not possible then maintain a lower predetermined number of tier separation when reusing the same primary scrambling codes in the identified formed clusters and if this is not possible and a single tier separation is not possible without reusing the same primary scrambling codes in the identified formed clusters then the primary scrambling codes are shuffled between the identified formed clusters in an attempt to create at least one tier separation between successive co-primary scrambling codes allocations and if this is not possible then use the primary scrambling codes from a reserved primary scrambling code set.

* * * * *

UNITED STATES PATENT AND TRADEMARK OFFICE
CERTIFICATE OF CORRECTION

Page 1 of 1

PATENT NO. : 8,717,887 B2
APPLICATION NO. : 13/204776
DATED : May 6, 2014
INVENTOR(S) : Sarkar et al.

It is certified that error appears in the above-identified patent and that said Letters Patent is hereby corrected as shown below:

In the Specification

Column 3, Lines 62-63, delete "communication is" and insert -- communication --, therefor.

Column 6, Line 64, delete "the to" and insert -- the --, therefor.

Column 7, Line 41, delete "than) 7" and insert -- than 17 --, therefor.

Column 8, Line 56, delete "If to" and insert -- If --, therefor.

Column 8, Line 65, delete "sets, 2," and insert -- sets 1, 2, --, therefor.

Column 14, Line 43, delete "handover in" and insert -- handover --, therefor.

Column 15, Line 12, delete "area" and insert -- are a --, therefor.

Signed and Sealed this
Fourth Day of November, 2014

Michelle K. Lee
*Deputy Director of the United States Patent and Trademark Office*